(12) United States Patent
Kusunoki et al.

(10) Patent No.: US 9,824,817 B2
(45) Date of Patent: Nov. 21, 2017

(54) WIRELESS POWER TRANSMISSION SYSTEM FOR TRANSMITTING POWER BETWEEN A POWER TRANSMITTING DEVICE AND A POWER RECEIVING DEVICE

(71) Applicant: Furukawa Electric Co., Ltd., Tokyo (JP)

(72) Inventors: Masahiro Kusunoki, Tokyo (JP); Mitsuru Masuda, Tokyo (JP); Hiroyuki Tamaoka, Tokyo (JP); Yoichi Iso, Tokyo (JP)

(73) Assignee: FURUKAWA ELECTRIC CO., LTD, Tokyo (JP)

( * ) Notice: Subject to any disclaimer, the term of this patent is extended or adjusted under 35 U.S.C. 154(b) by 681 days.

(21) Appl. No.: 14/334,310

(22) Filed: Jul. 17, 2014

(65) Prior Publication Data

US 2014/0327321 A1    Nov. 6, 2014

Related U.S. Application Data

(63) Continuation of application No. PCT/JP2013/050982, filed on Jan. 18, 2013.

(30) Foreign Application Priority Data

Jan. 18, 2012    (JP) .................. 2012-008037

(51) Int. Cl.
   *H01F 38/14*    (2006.01)
   *H04B 5/00*    (2006.01)
   (Continued)

(52) U.S. Cl.
   CPC .............. *H01F 38/14* (2013.01); *H02J 17/00* (2013.01); *H04B 5/0012* (2013.01);
   (Continued)

(58) Field of Classification Search
   CPC .... H01F 38/14; H01F 2038/146; H02J 17/00; H02J 7/025; H04B 5/0012; H04B 5/0037
   (Continued)

(56) References Cited

U.S. PATENT DOCUMENTS 8,540,161 B2 * 9/2013 Shionoiri ......... G06K 19/07783
                                                           235/486
2004/0005889 A1    1/2004 Nishimura et al.
   (Continued)

FOREIGN PATENT DOCUMENTS

JP    H08-340285 A    12/1996
JP    2004-038254 A    2/2004
   (Continued)

OTHER PUBLICATIONS

Extended European Search Report dated Sep. 30, 2015 is corresponding European Patent Application No. 13739121.5.
   (Continued)

*Primary Examiner* — Jared Fureman
*Assistant Examiner* — Michael Warmflash
(74) *Attorney, Agent, or Firm* — Thompson Coburn LLP

(57) ABSTRACT

A wireless power transmission system that transmits alternating-current power includes a power-transmitting device including first and second electrodes spaced apart and having a total width of $\lambda/2\pi$ or less, i.e., a near field range, and a first inductor between the first and second electrodes and a AC power-generating section, and a power-receiving device including third and fourth electrodes spaced apart and having a total width of $\lambda/2\pi$ or less, and a second inductor between the third and fourth electrodes and a load. A coupler including the first and second electrodes and the first inductor forms one resonant circuit and a coupler including the third and fourth electrodes and the second inductor forms another resonant circuit. Resonance frequencies of the cou-
   (Continued)

plers are substantially equal. The first and second electrodes and the third and fourth electrodes are spaced apart by λ/2π or less.

14 Claims, 20 Drawing Sheets

(51) Int. Cl.
    *H02J 17/00*     (2006.01)
    *H02J 7/02*     (2016.01)
(52) U.S. Cl.
    CPC ..... *H04B 5/0037* (2013.01); *H01F 2038/146* (2013.01); *H02J 7/025* (2013.01)
(58) Field of Classification Search
    USPC .......................................................... 307/104
    See application file for complete search history.

(56) References Cited

U.S. PATENT DOCUMENTS

| | | | |
|---|---|---|---|
| 2004/0233043 A1 | 11/2004 | Yazawa et al. | |
| 2008/0064331 A1* | 3/2008 | Washiro | H04B 5/0012 455/41.1 |
| 2009/0096556 A1* | 4/2009 | Washiro | H01Q 1/36 333/24 R |
| 2009/0302690 A1* | 12/2009 | Kubono | H02J 17/00 307/109 |
| 2010/0292859 A1* | 11/2010 | Terasaki | B60M 3/00 700/295 |
| 2011/0101788 A1* | 5/2011 | Sun | H01F 38/14 307/104 |
| 2011/0241435 A1* | 10/2011 | Saito | H02J 5/005 307/104 |
| 2012/0146574 A1 | 6/2012 | Ichikawa et al. | |
| 2013/0009488 A1* | 1/2013 | Choe | H02J 5/005 307/104 |
| 2015/0333538 A1* | 11/2015 | Kusunoki | H02J 17/00 307/104 |

FOREIGN PATENT DOCUMENTS

| | | | | |
|---|---|---|---|---|
| JP | 2004-348496 A | 12/2004 | | |
| JP | 2005-079786 A | 3/2005 | | |
| JP | 2009-296857 A | 12/2009 | | |
| JP | WO 2011083594 A1 * | 7/2011 | ............. | H02J 5/005 |
| WO | 2010/014634 A2 | 2/2010 | | |
| WO | 2010/150318 A1 | 12/2010 | | |
| WO | 2011/083594 A1 | 7/2011 | | |

OTHER PUBLICATIONS

The Journal of the Institute of Electrical Engineers of Japan, 2009, pp. 415, vol. 129.
International Search Report and Written Opinion dated Apr. 16, 2013 for PCT/JP2013/050982.
International Preliminary Report on Patentability dated Jul. 22, 2014 for PCT/JP2013/050982.
Office Action dated Apr. 7, 2014 for corresponding Japanese Patent Application No. JP2013-554363.

* cited by examiner

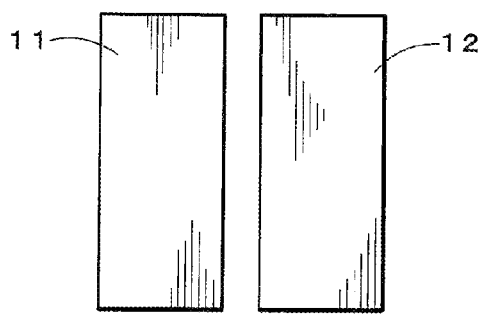
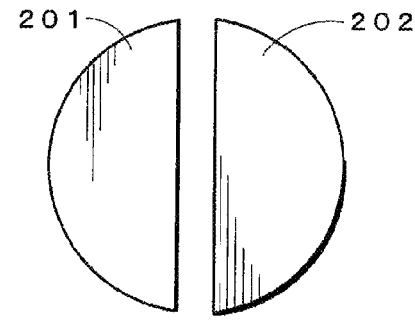
FIG. 2A              FIG. 2B
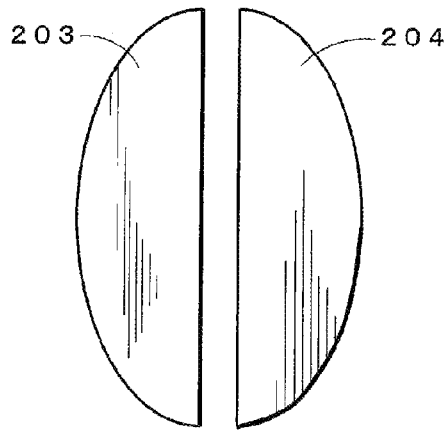
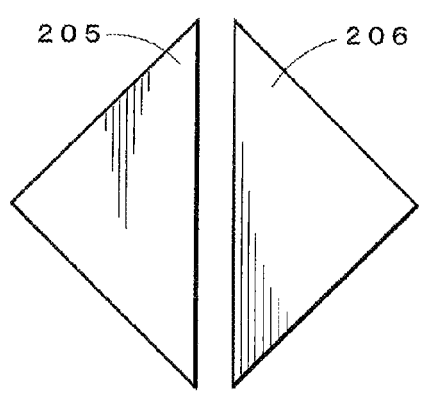
FIG. 2C              FIG. 2D
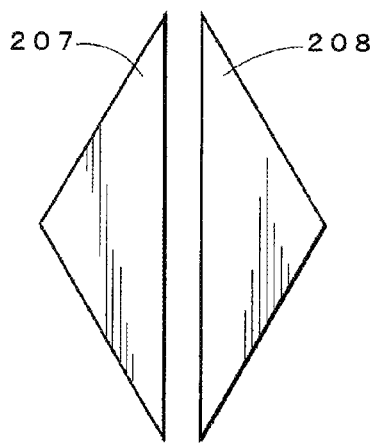
FIG. 2E

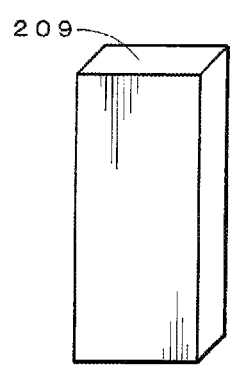 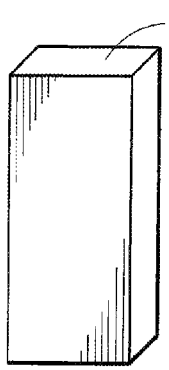 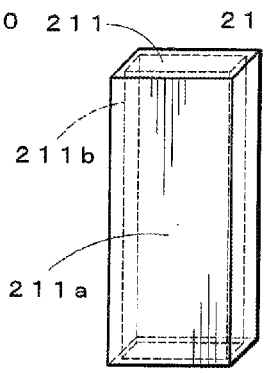 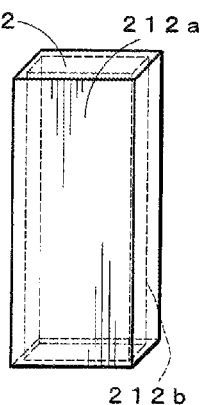
F I G. 3 A    F I G. 3 B
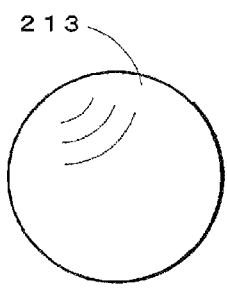 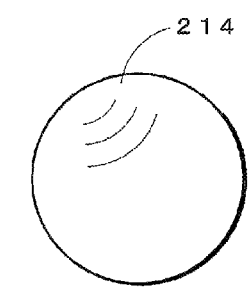 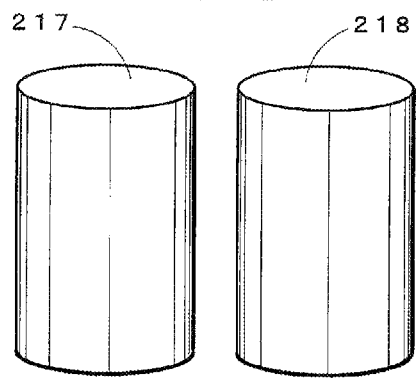
F I G. 3 C    F I G. 3 E
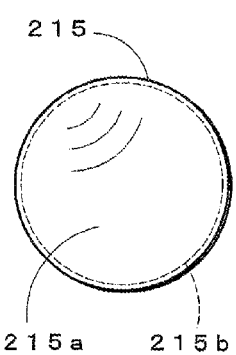 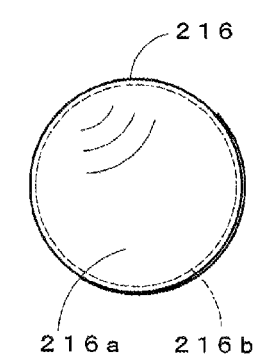 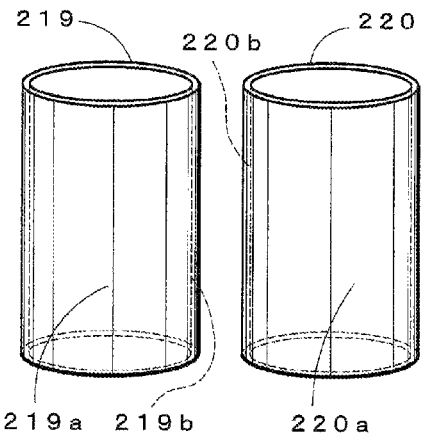
F I G. 3 D    F I G. 3 F

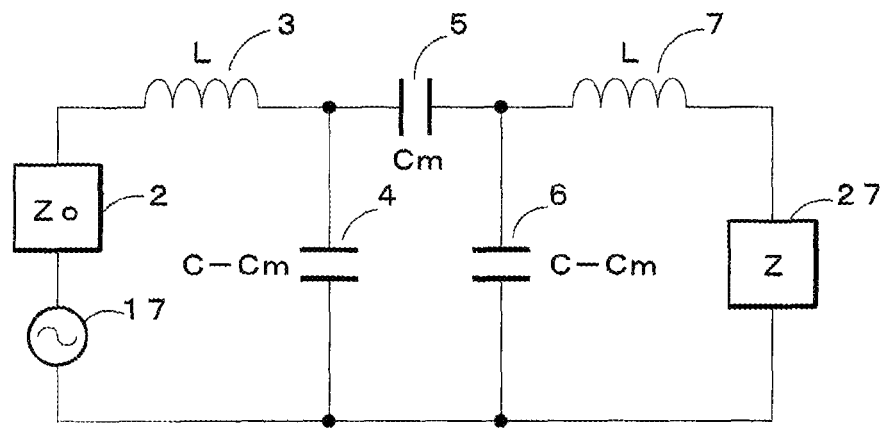
F I G. 5
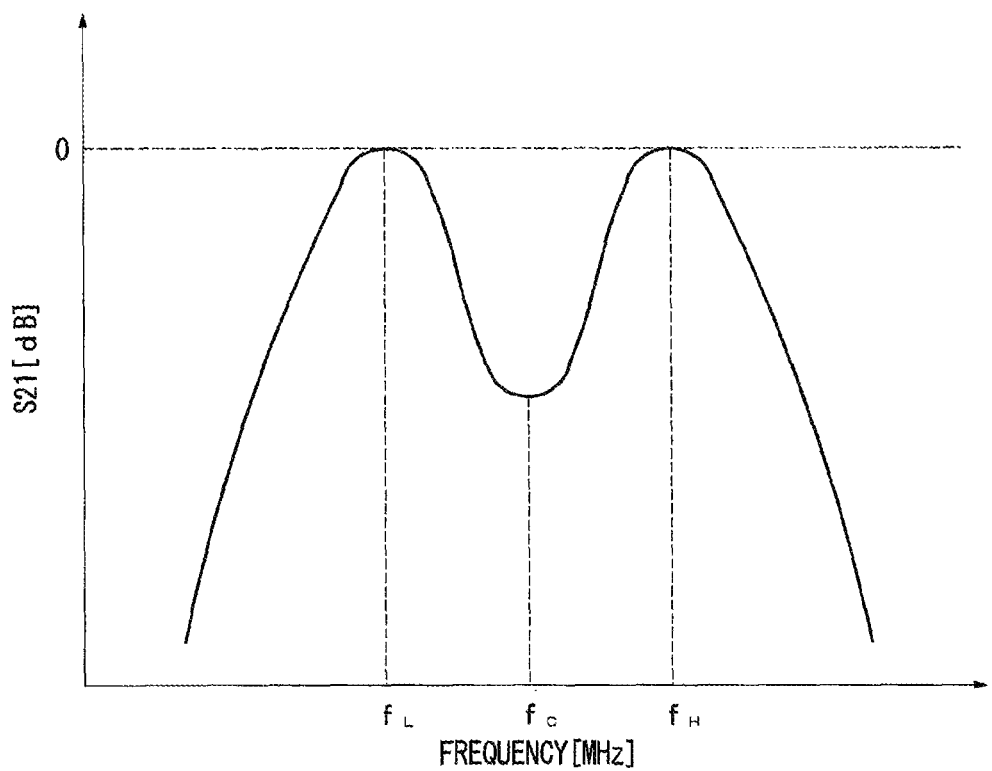
F I G. 6

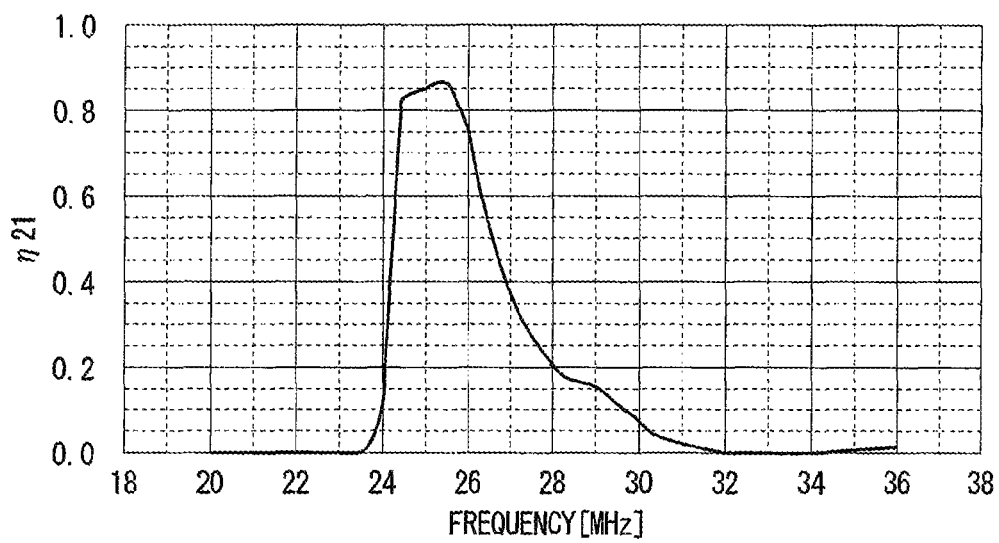
F I G. 1 2
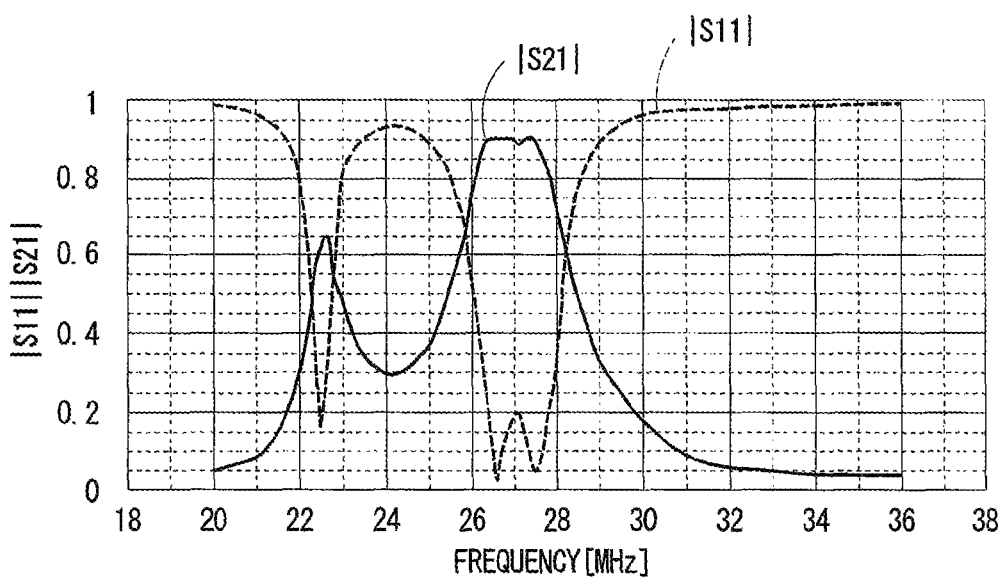
F I G. 1 3

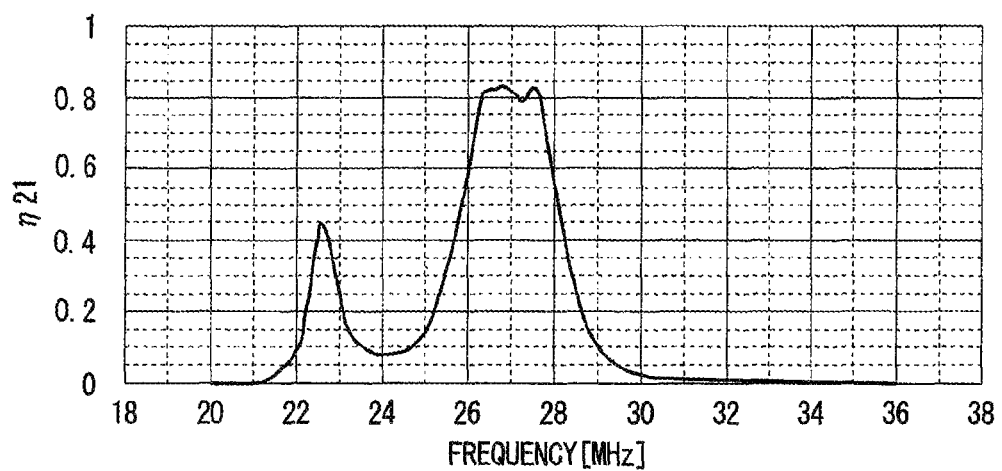
F I G. 1 4
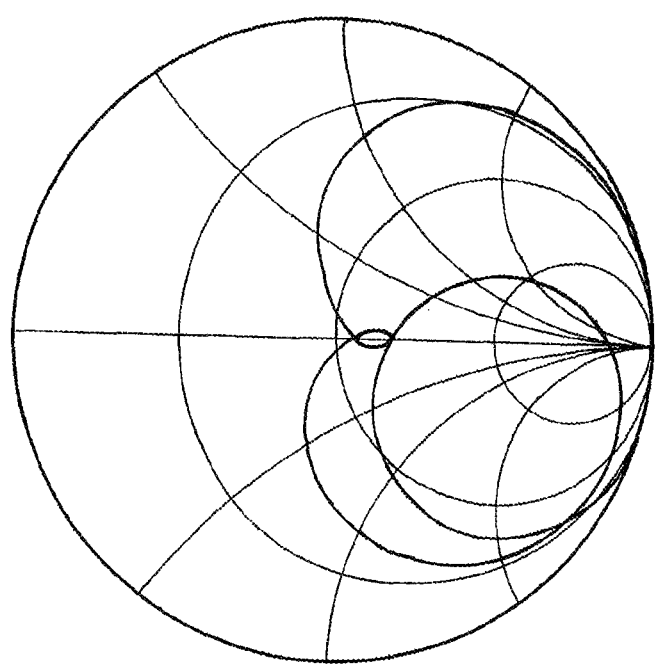
F I G. 1 5

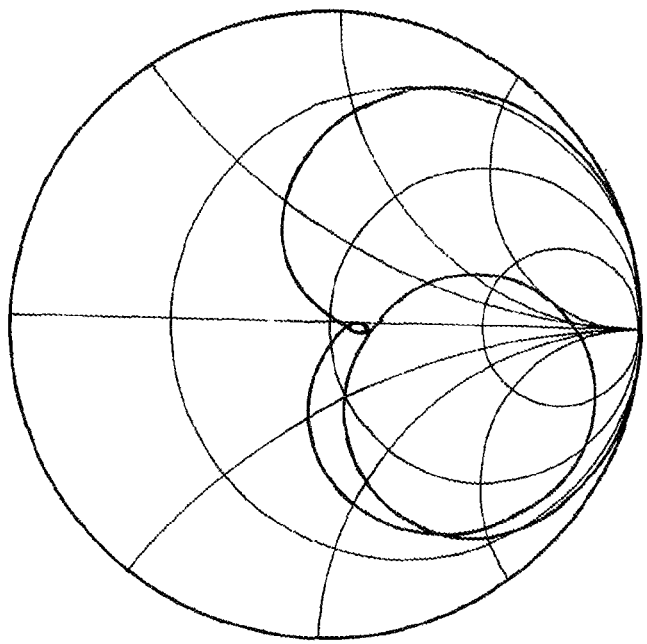
F I G. 1 6
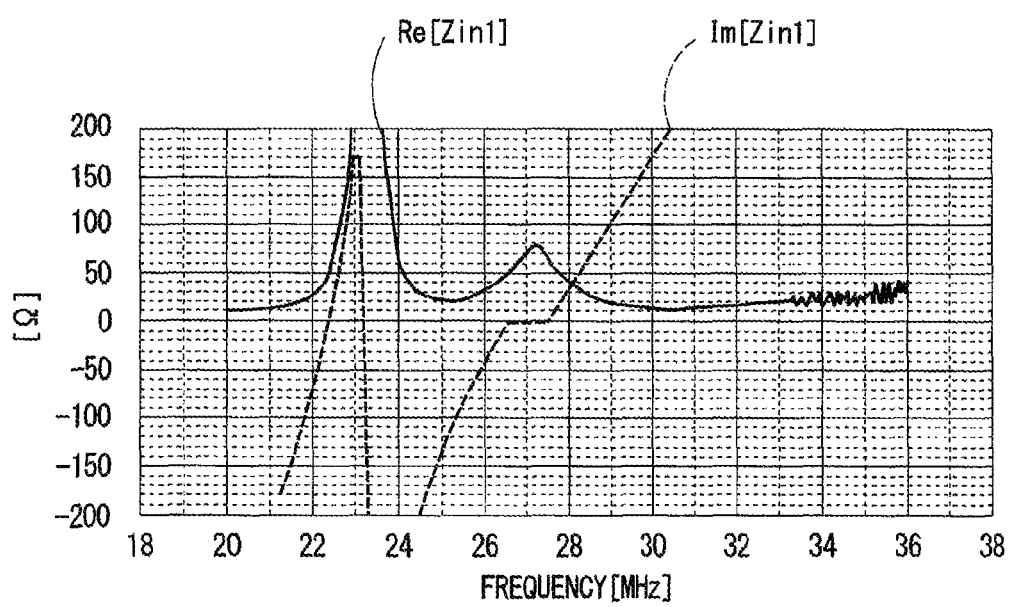
F I G. 1 7

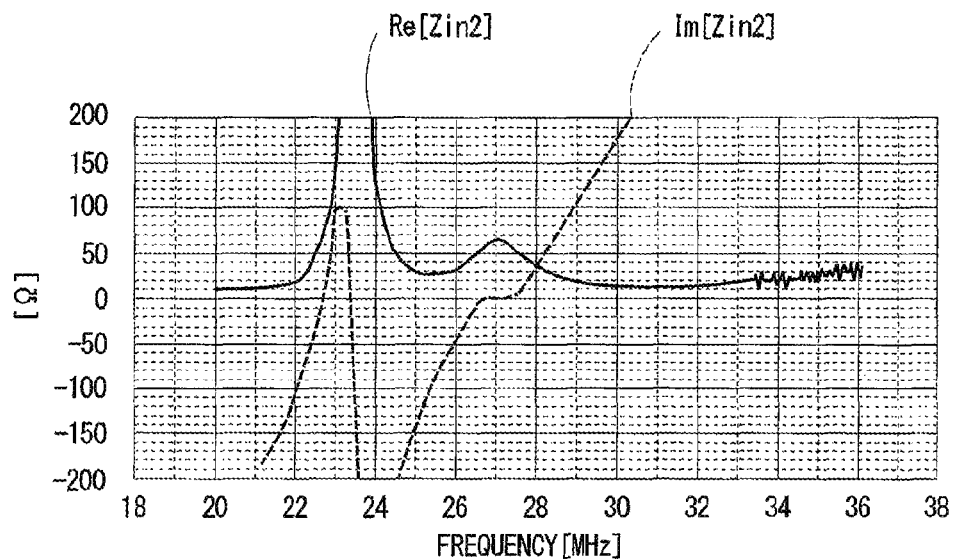
F I G. 1 8
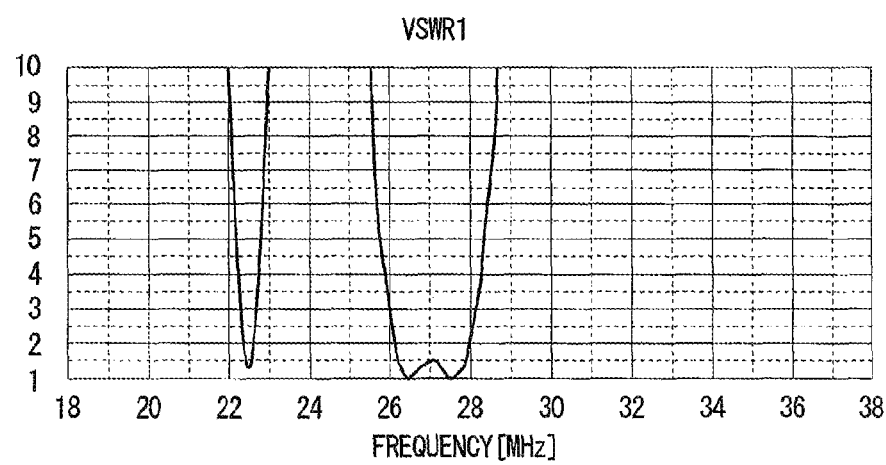
F I G. 1 9

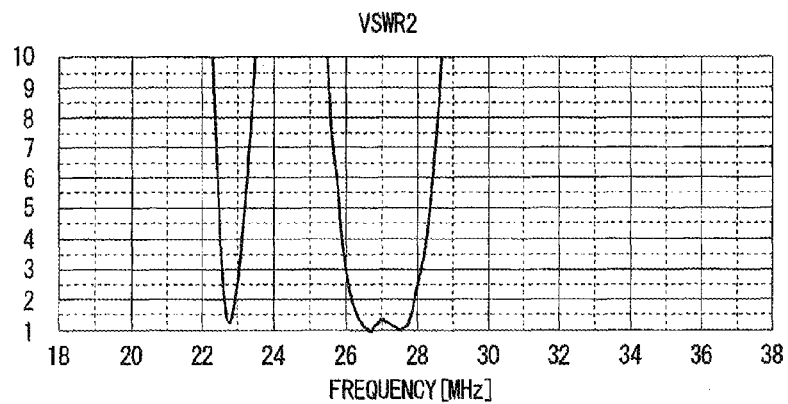
F I G. 20
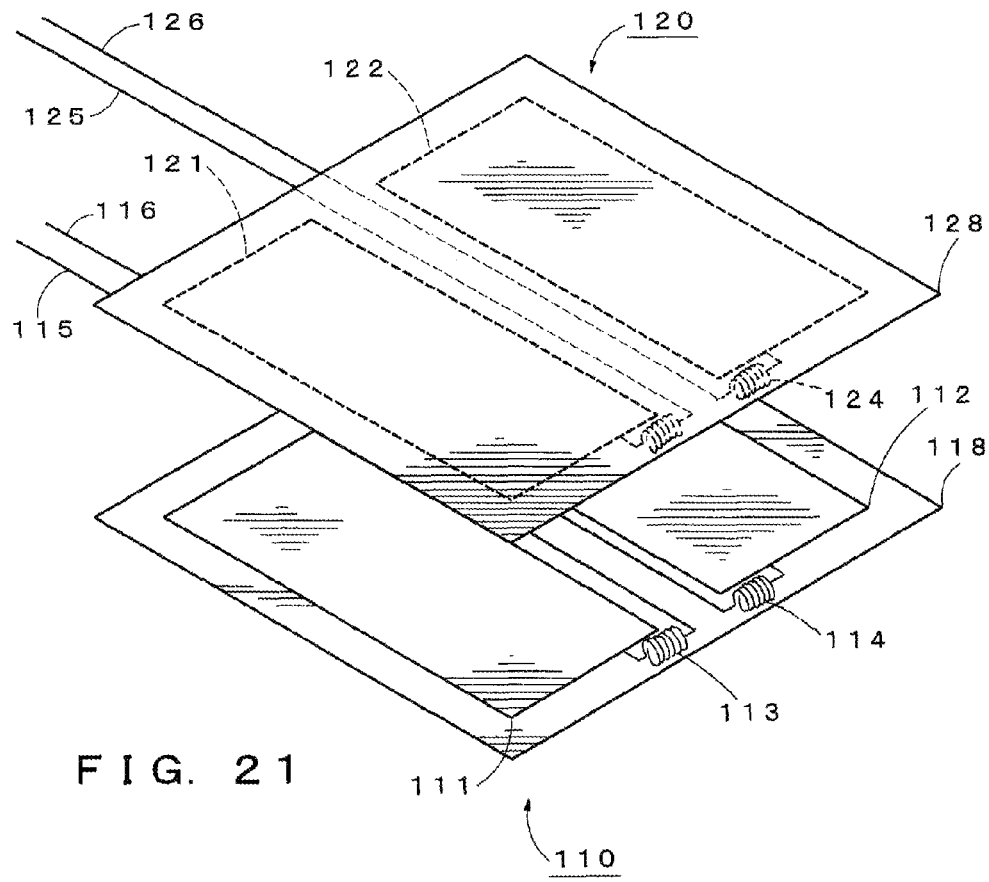
F I G. 21

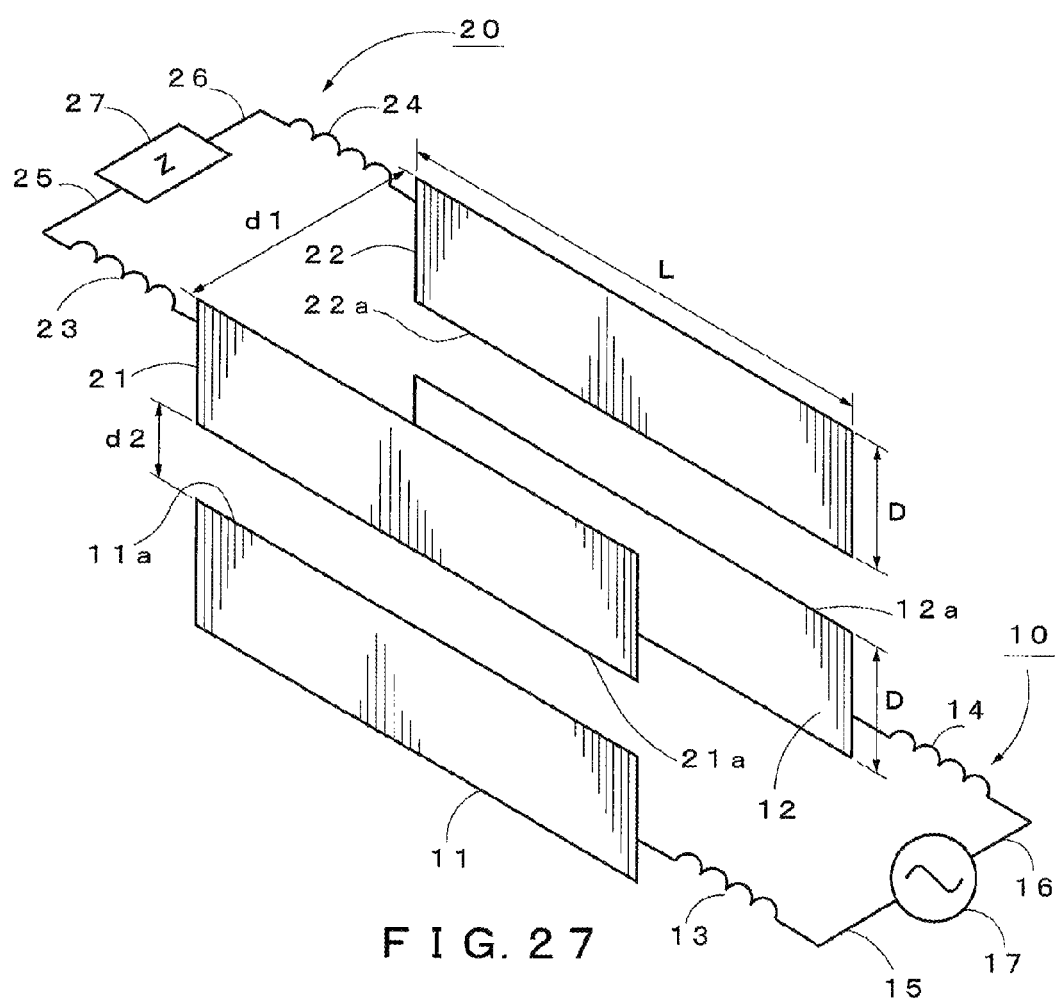
F I G. 27

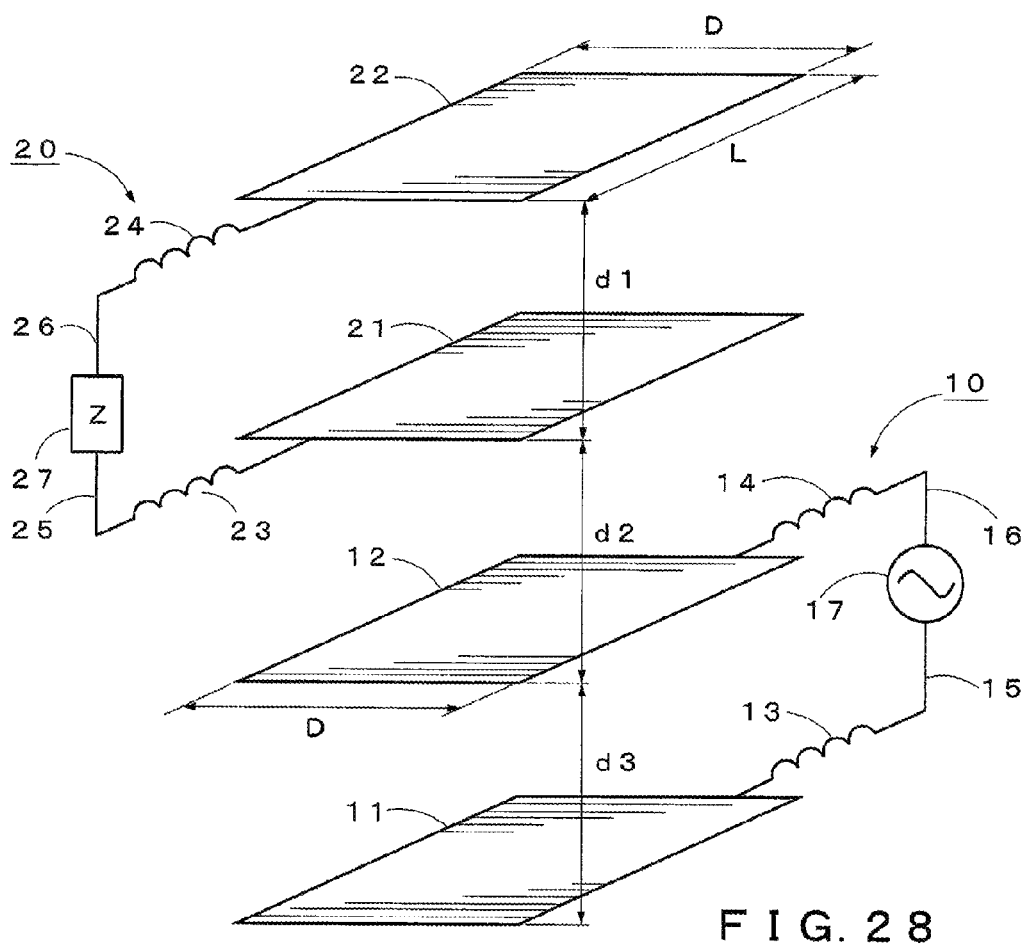
F I G. 28

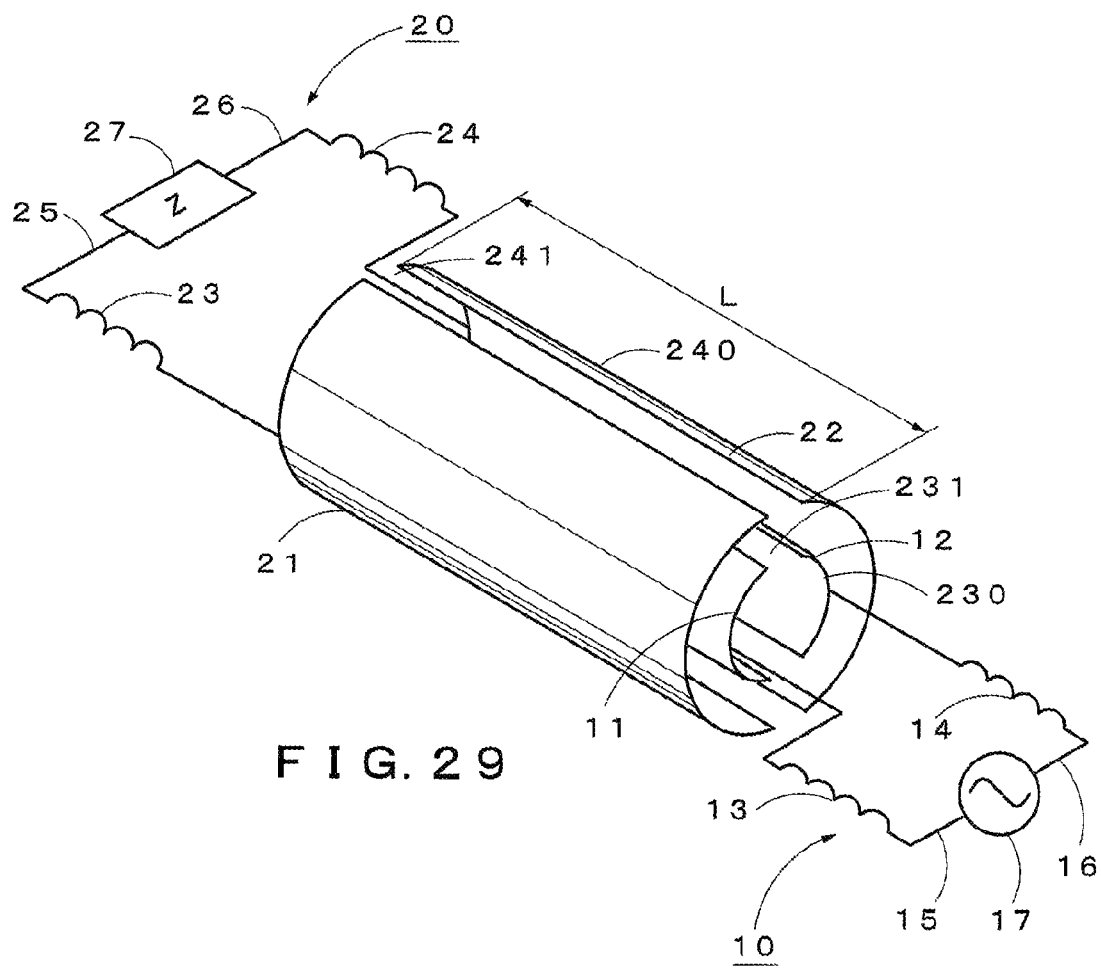
F I G. 29

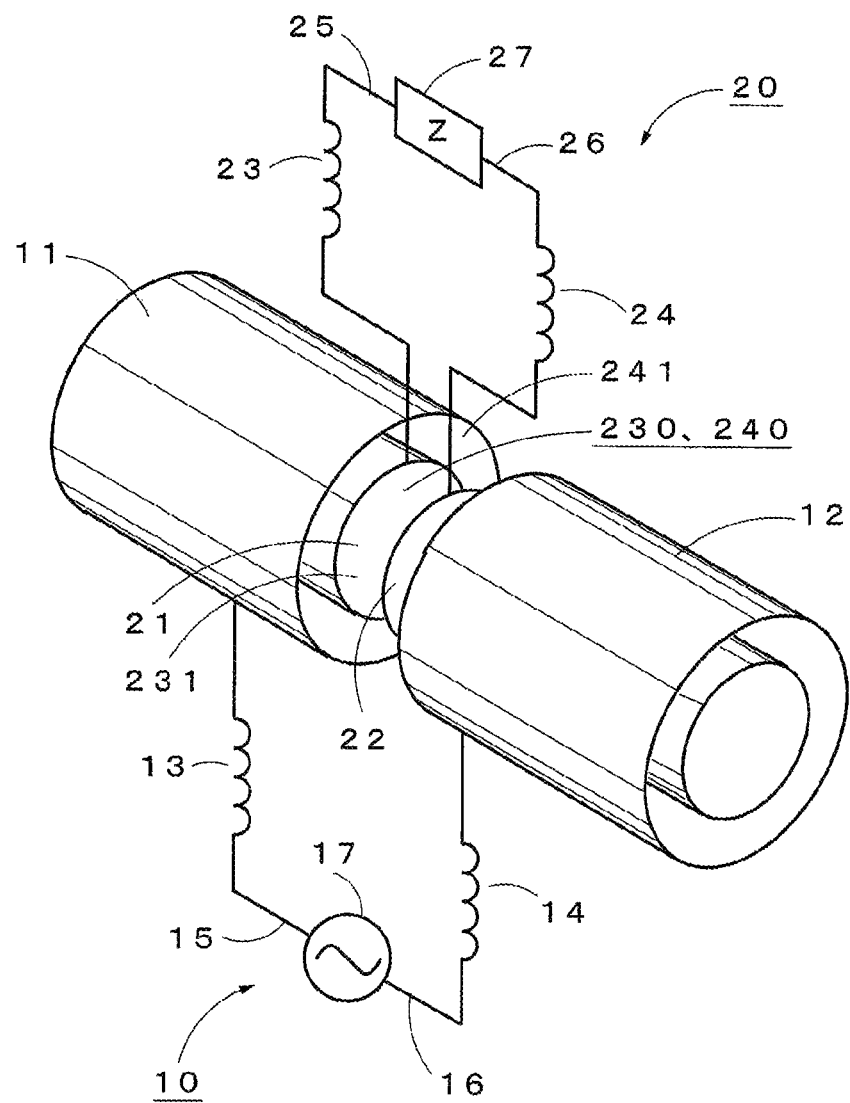
F I G. 30

WIRELESS POWER TRANSMISSION SYSTEM FOR TRANSMITTING POWER BETWEEN A POWER TRANSMITTING DEVICE AND A POWER RECEIVING DEVICE

CROSS REFERENCE TO RELATED APPLICATIONS

This is a continuation application of International Patent Application No. PCT/JP2013/050982 filed Jan. 18, 2013, which claims the benefit of Japanese Patent Application No. 2012-008037 filed Jan. 18, 2012, the full contents of all of which are hereby incorporated by reference in their entirety.

BACKGROUND

Technical Field

The present disclosure relates to a wireless power transmission system, a power transmitting device and a power receiving device.

Background

Japanese Laid-Open Patent Publication No. H8-340285 discloses a wireless electric power transmission apparatus that uses electromagnetic induction to transmit electric power between two non-contact electric circuits.

The Journal of The Institute of Electrical Engineers of Japan Vol. 129 (2009), No. 7, pages 414-417 discloses a wireless electric power transmission apparatus that uses magnetic field resonance and electric field resonance to transmit electric power between two non-contact electric circuits.

With the technique disclosed in Japanese Laid-Open Patent Publication No. H8-340285, due to a large electric power loss in a coil for transmitting electric power, there is a disadvantage that electric power cannot be transmitted efficiently. Further, with the technique disclosed in Japanese Laid-Open Patent Publication No. H8-340285, referring to the description such as paragraph (0058) of such document, a distance across which electric power can be transmitted is limited within a range in a millimeter order to a centimeter order, and thus there are limited applications.

With the technique using magnetic field resonance disclosed in The Journal of The Institute of Electrical Engineers of Japan Vol. 129 (2009), No. 7, pages 414-417, although a distance through which electric power can be transmitted can be extended to an order of tens of centimeters to a meter order, it is necessary use a coil, which is obtained by winding a conductor, to produce a magnetic field to obtain resonance. When transmitting electric power, since it is necessary to let an electric current flow through this coil, a conductor loss cannot be avoided. Further, since the conductor used for the coil is generally a metal wire rod, there will be an increase in the mass of the power transmission/reception apparatus incorporating such a coil.

Further, with the technique using electric field resonance disclosed in The Journal of The Institute of Electrical Engineers of Japan Vol. 129 (2009), No. 7, pages 414-417, instead of a magnetic field, an electric field is used for resonance. According to such a technique, although a coil is not used in resonance, an electric length at which resonance is obtained needs to be obtained by a conductor line. Thus, electrodes for electric field coupling needs to be used that are conductor lines having a length of a quarter-wavelength symmetrically disposed in a meandering manner from a power feeding point and a power receiving point, respectively. Therefore, for example, when a resonance frequency is low, a conductor line length of the electrode for obtaining resonance becomes longer. Also, an alternating current resistance due to interference between spatially adjacent electrically-conductive lines, namely, due to the coupling between the wires causes a conductor loss in a similar manner as the magnetic field resonance, and transmission efficiency of the electric power decreases. Particularly, as a gap between electrically conductive lines of the electrodes for electric field coupling is narrowed to reduce an electrode size, the alternating current resistance due to the coupling between wires increases.

SUMMARY

Accordingly, it is an object of the present disclosure to provide a wireless power transmission system, a power transmitting device and a power receiving device that can extend a distance through which electric power can be transmitted in a non-contact manner and can transmit electric power efficiently. Further, the weight of the power transmitting device and the power receiving device can be reduced.

In order to solve the aforementioned problem, according to an aspect of the disclosure, a wireless power transmission system that wirelessly transmits alternating current power from a power transmitting device to a power receiving device is provided that includes the power transmitting device including: first and second electrodes spaced apart by a predetermined distance, the first and second electrodes having a total width, including the predetermined distance, of less than or equal to $\lambda/2\pi$, which is a near field range; first and second connection lines that electrically connect the first and second electrodes and two output terminals of an alternating current power generating section, respectively; and at least one first inductor that is interposed between the first and second electrodes and at least one of the two output terminals of the alternating current power generating section, the power receiving device including: third and fourth electrodes spaced apart by a predetermined distance, the third and fourth electrodes having a total width, including the predetermined distance, of less than or equal to $\lambda/2\pi$, which is a near field range; third and fourth connection lines that electrically connect the third and fourth electrodes and two input terminals of a load, respectively; and at least one second inductor that is interposed between the third and fourth electrodes and at least one of the two input terminals of the load, a coupler including the first and second electrodes and the at least one first inductor forms one resonant circuit and a coupler including the third and fourth electrodes and the at least one second inductor forms another resonant circuit, a resonance frequency of the coupler including the first and second electrodes and the at least one first inductor and a resonance frequency of the coupler including the third and fourth electrodes and the at least one second inductor being configured to be substantially equal, the first and second electrodes and the third and fourth electrodes being spaced apart by a distance of less than or equal to $\lambda/2\pi$, which is a near field range.

With such a configuration, electric power can be transmitted efficiently.

Further, in addition to the above aspect, in another aspect of the disclosure, the first to fourth electrodes have a flat plate shape.

With such a configuration, a space required for installation can be reduced.

Further, in addition to the above aspect, in another aspect of the disclosure, the first and second electrodes and the third and fourth electrodes are disposed in the same plane, respectively.

With such a configuration, since respective electrodes are formed integrally, fabrication can be facilitated.

Further, in addition to the above aspect, in another aspect of the disclosure, the first and third electrodes and the second and fourth electrodes are disposed substantially in parallel.

With such a configuration, a space required for installation can be reduced and electric power can be transmitted efficiently.

Further, in addition to the above aspect, in another aspect of the disclosure, a frequency of the alternating current power generating section is configured to be substantially the same frequency as a resonance frequency of the coupler including the first and second electrodes and the at least one first inductor.

With such a configuration, since the alternating current frequency is set to match the resonance frequency, transmission efficiency can be further improved.

Further, in addition to the above aspect, in another aspect of the disclosure, a frequency of the alternating current power generating section is set at a frequency at which transmission efficiency of power from the power transmitting device to the power receiving device is maximum.

With such a configuration, transmission efficiency can be maximized.

Further, in addition to the above aspect, in another aspect of the disclosure, the at least one first inductor includes two inductors that are an inductor interposed between the first electrode and the first connection line and an inductor interposed between the second electrode and the second connection line, and the at least one second inductor includes two inductors that are an inductor interposed between the third electrode and the third connection line and an inductor interposed between the fourth electrode and the fourth connection line.

With such a configuration, designing can be facilitated.

Further, in addition to the above aspect, in another aspect of the disclosure, the first and second connection lines are disposed in such a manner that regions of the first and second electrodes and a region interposed therebetween are avoided and in a direction extending away from the regions.

With such a configuration, since interference between the connection lines and the electrodes is prevented, transmission efficiency can be improved.

Further, in addition to the above aspect, in another aspect of the disclosure, the third and fourth connection lines are disposed in such a manner that regions of the third and fourth electrodes and a region interposed therebetween are avoided and in a direction extending away from the regions.

With such a configuration, since interference between the connection lines and the electrodes is prevented, transmission efficiency can be improved.

Further, in addition to the above aspect, in another aspect of the disclosure, further comprises a relay device including fifth and sixth electrodes spaced apart by a predetermined distance, the fifth and sixth electrodes having a total width, including the predetermined distance, of less than or equal to $\lambda/2\pi$, which is a near field range and a third inductor connected between the fifth and sixth electrodes, the fifth and sixth electrodes being disposed between the first and second electrodes of the power transmitting device and the third and fourth electrodes of the power receiving device, a resonance frequency of a coupler including the fifth and sixth electrodes and the third inductor and a resonance frequency of couplers of the power transmitting device and the power receiving device being configured to be substantially equal.

With such a configuration, electric power can be transmitted efficiently through a greater distance.

Further, in another aspect of the disclosure, a wireless power transmission system that wirelessly transmits alternating current power from a power transmitting device to a power receiving device is provided that includes the power transmitting device including first and second electrodes spaced apart by a predetermined distance, the first and second electrodes having a total width, including the predetermined distance, of less than or equal to $\lambda/2\pi$, which is a near field range; first and second connection lines that electrically connect the first and second electrodes and two output terminals of an alternating current power generating section, respectively; and at least one first inductor that is interposed between the first and second electrodes and at least one of the two output terminals of the alternating current power generating section, the power receiving device including: third and fourth electrodes spaced apart by a predetermined distance, the third and fourth electrodes having a total width, including the predetermined distance, of less than or equal to $\lambda/2\pi$, which is a near field range; third and fourth connection lines that electrically connect the third and fourth electrodes and two input terminals of a load, respectively; and at least one second inductor that is interposed between the third and fourth electrodes and at least one of the two input terminals of the load, a coupler including the first and second electrodes and the at least one first inductor forms one resonant circuit and a coupler including the third and fourth electrodes and the at least one second inductor forms another resonant circuit, a resonance frequency of the coupler including the first and second electrodes and the at least one first inductor and a resonance frequency of the coupler including the third and fourth electrodes and the at least one second inductor being configured to be substantially equal, the first and second electrodes and the third and fourth electrodes being spaced apart by a distance of less than or equal to $\lambda/2\pi$, which is a near field range, the first and second electrodes having a curved shape and oppose each other to form a first tubular structure, an outer periphery of the first tubular structure having a length of less than or equal to $\lambda/2\pi$, which is a near field range; the third and fourth electrodes have a curved shape and oppose each other to form a second tubular structure, an outer periphery of the second tubular structure having a length of less than or equal to $\lambda/2\pi$, which is a near field range; and the first and second tubular structures being disposed substantially concentrically in such a manner that a slit separating the first and second electrodes and a slit separating the third and fourth electrodes oppose each other.

With such a configuration, even if the coupler is slid in an axial direction, electric power transmission can be performed.

Further, in addition to the above aspect, in another aspect of the disclosure, an insulating coating is applied on exposed surfaces of the first and second electrodes; and an insulating coating is applied on exposed surfaces of the third and fourth electrodes.

With such a configuration, a decrease in power transmission efficiency due to corrosion of the electrodes can be suppressed and the discharging from the electrodes can be prevented.

Further, according to an aspect of the disclosure, a power transmitting device in a wireless power transmission system that wirelessly transmits alternating current power from a power transmitting device to a power receiving device includes first and second electrodes spaced apart by a predetermined distance, the first and second electrodes having a total width, including the predetermined distance, of less than or equal to $\lambda/2\pi$, which is a near field range; first and second connection lines that electrically connect the first and second electrodes and two output terminals of an alternating current power generating section, respectively; and at least one first inductor that is interposed between the first and second electrodes and at least one of the two output terminals of the alternating current power generating section, a coupler including the first and second electrodes and the at least one first inductor forms one resonant circuit and a coupler including third and fourth electrodes of the power receiving device and the at least one second inductor forms another resonant circuit, a resonance frequency of the coupler including the first and second electrodes and the at least one first inductor is configured to be substantially equal to a resonance frequency of the coupler including the third and fourth electrodes and the at least one second inductor of the power receiving device, the first and second electrodes and the third and fourth electrodes being spaced apart by a distance of less than or equal to $\lambda/2\pi$, which is a near field range.

With such a configuration, electric power can be transmitted efficiently.

Further, according to an aspect of the disclosure, a power receiving device in a wireless power transmission system that wirelessly transmits alternating current power from a power transmitting device to a power receiving device comprises third and fourth electrodes spaced apart by a predetermined distance, the third and fourth electrodes having a total width, including the predetermined distance, of less than or equal to $\lambda/2\pi$, which is a near field range; third and fourth connection lines that electrically connect the third and fourth electrodes and two input terminals of a load, respectively; and at least one second inductor that is interposed between the third and fourth electrodes and at least one of the two input terminals of the load, a coupler including first and second electrodes of the power transmitting device and the at least one first inductor forms one resonant circuit and a coupler including the third and fourth electrodes and the at least one second inductor forms another resonant circuit, a resonance frequency of the coupler including the third and fourth electrodes and the at least one second inductor is configured to be substantially equal to a resonance frequency of the coupler including the first and second electrodes and the at least one first inductor of the power transmitting device.

With such a configuration, electric power can be transmitted efficiently.

According to the present disclosure, it is possible to provide a wireless power transmission system, a power transmitting device and a power receiving device that can transmit electric power efficiently.

BRIEF DESCRIPTION OF DRAWINGS

FIG. 2A is a diagram showing an embodiment of a shape of electrodes of the present disclosure in which the shape of electrodes is substantially rectangular.

FIG. 2B is a diagram showing an alternative embodiment of the shape of electrodes of the present disclosure in which the shape of electrodes is substantially circular.

FIG. 2C is a diagram showing an alternative embodiment of the shape of electrodes of the present disclosure in which the shape of electrodes is substantially elliptical.

FIG. 2D is a diagram showing an alternative embodiment of the shape of electrodes of the present disclosure in which the shape of electrodes is substantially a diamond shape with four equal internal angles.

FIG. 2E is a diagram showing an alternative embodiment of the shape of electrodes of the present disclosure in which the shape of electrodes is substantially a diamond shaped with four internal angles that are not equal.

FIG. 3A is a diagram showing an alternative embodiment of the shape of electrodes of the present disclosure in which the shape of electrodes is substantially prismatic.

FIG. 3B is a diagram showing an alternative embodiment of the shape of electrodes of the present disclosure in which the shape of electrodes is substantially prismatic that has only an outer shell portion.

FIG. 3C is a diagram showing an alternative embodiment of the shape of electrodes of the present disclosure in which the shape of electrodes is substantially spherical.

FIG. 3D is a diagram showing an alternative embodiment of the shape of electrodes of the present disclosure in which the shape of electrodes is substantially spherical that has only an outer shell portion.

FIG. 3E is a diagram showing an alternative embodiment of the shape of electrodes of the present disclosure in which the shape of electrodes is substantially cylindrical.

FIG. 3F is a diagram showing an alternative embodiment of the shape of electrodes of the present disclosure in which the shape of electrodes is substantially cylindrical that has only an outer shell portion.

FIG. 5 is a diagram showing an equivalent circuit of the embodiment shown in FIG. 1.

FIG. 6 is a diagram showing transmission characteristics of the equivalent circuit shown in FIG. 5.

FIG. 12 is a graph showing frequency characteristics of transmission efficiency of the embodiment shown in FIG. 8.

FIG. 13 is a graph showing frequency characteristics of an absolute value of each of parameters S11 and S21 of the embodiment shown in FIG. 8.

FIG. 14 is a graph showing frequency characteristics of the transmission efficiency of the embodiment shown in FIG. 8.

FIG. 15 is a Smith chart of an input impedance of the power transmission coupler of the embodiment shown in FIG. 8.

FIG. 16 is a Smith chart of an output impedance of the power reception coupler of the embodiment shown in FIG. 8.

FIG. 17 is a graph showing frequency characteristics of a real part and an imaginary part of an input impedance of the power transmission coupler of the embodiment shown in FIG. 8.

FIG. 18 is a graph showing frequency characteristics of a real part and an imaginary part of an output impedance of the power reception coupler of the embodiment shown in FIG. 8.

FIG. 19 is a graph showing frequency characteristics of VSWR of the power transmission coupler of the embodiment shown in FIG. 8.

FIG. 20 is a graph showing frequency characteristics of VSWR of the power reception coupler of the embodiment shown in FIG. 8.

FIG. 21 is a diagram showing a configuration example in which connection lines are disposed between the electrodes.

FIG. 27 is a diagram showing an alternative embodiment of FIG. 1 in which coupler electrodes are opposed.

FIG. 28 is a diagram showing an alternative embodiment of FIG. 1 in which coupler electrodes are opposed.

FIG. 29 is a diagram showing an alternative embodiment of FIG. 1 in which coupler electrodes have a tubular structure.

FIG. 30 is a diagram showing an alternative embodiment of FIG. 1 in which coupler electrodes have a tubular structure.

DETAILED DESCRIPTION

Hereinafter, embodiments of the present disclosure will be described.

(A) Explanation of Principle of Operation of Embodiment

Figure 1:
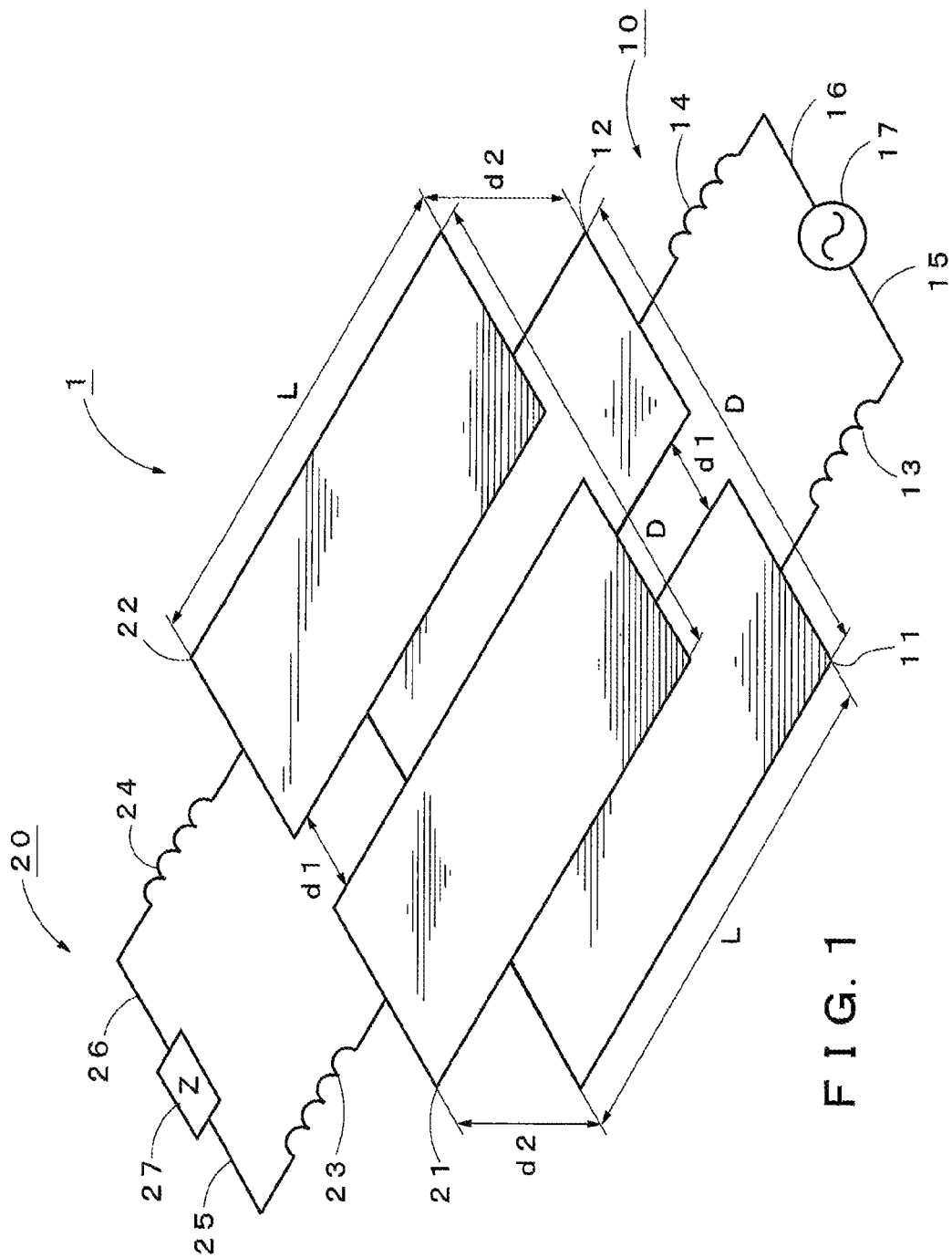
FIG. 1 is a diagram for explaining a principle of operation of an embodiment of the present disclosure.

FIG. 1 is a diagram for explaining a principle of operation of a wireless power transmission system 1 of an embodiment of the present disclosure. As shown in this diagram, the wireless power transmission system 1 includes a power transmitting device 10 and a power receiving device 20.

The power transmitting device 10 includes electrodes 11 and 12, inductors 13 and 14, connection lines 15 and 16, and an AC (alternating current) power generating section 17. The power receiving device 20 includes electrodes 21 and 22, inductors 23 and 24, connection lines 25 and 26, and a load 27. The electrodes 11, 12 and the inductors 13, 14 constitute a power transmission coupler. The electrodes 21, 22 and the inductors 23, 24 constitute a power reception coupler.

Figure 4A:
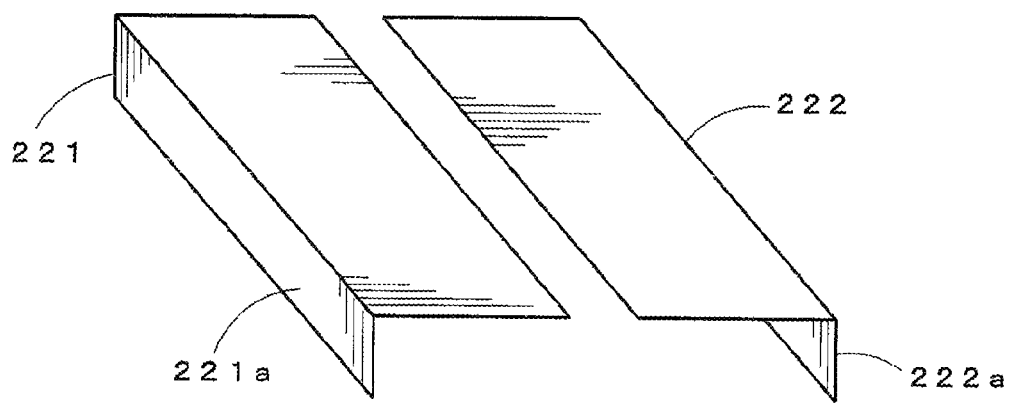
FIG. 4A is a diagram showing an alternative embodiment of the shape of electrodes of the present disclosure in a perspective view showing that the shape of electrodes is obtained by bending a plate.
Figure 4B:
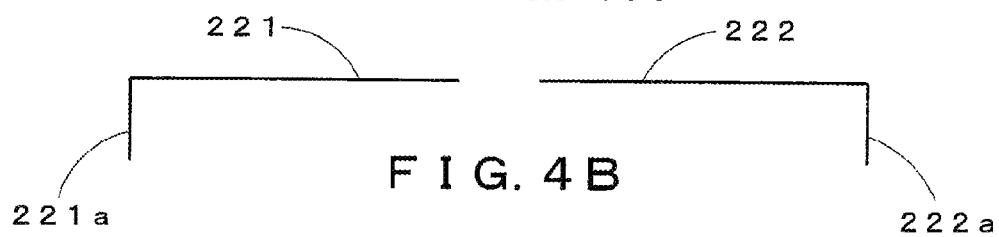
FIG. 4B is a diagram showing an alternative embodiment of the shape of electrodes of the present disclosure in a cross-sectional view showing that the shape of electrodes is obtained by bending a plate.
Figure 4C:
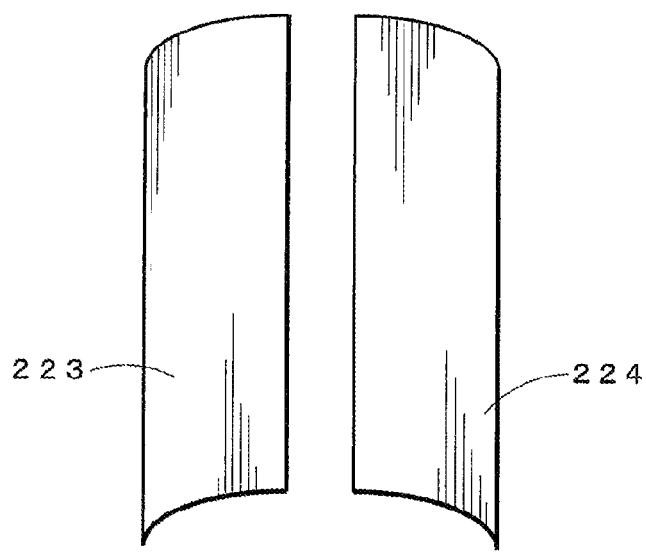
FIG. 4C is a diagram showing an alternative embodiment of the shape of electrodes of the present disclosure in a perspective view showing that the shape of electrodes is obtained by flexing a plate.
Figure 4D:
FIG. 4D is a diagram showing an alternative embodiment of the shape of electrodes of the present disclosure in a cross-sectional view showing that the shape of electrodes is obtained by flexing a plate.

The electrodes 11, 12 are constituted by members having conductivity and are disposed across a predetermined distance d1. In an example of FIG. 1, the electrodes 11, 12, 21 and 22 are exemplified by flat plate electrodes having a rectangle shape of substantially the same size. The electrode 11 and the electrode 21 are disposed in parallel and opposing each other across a distance d2, and the electrode 12 and the electrode 22 are disposed in parallel and opposing each other across the same distance d2. Note that, the electrodes 11, 12, 21 and 22 may be electrodes having a shape other than the shape shown in FIG. 1. For example, other than the plate-like rectangular electrodes 11 and 12 shown in FIG. 2A, electrodes having, for example, shapes described below can be used. In other words, it is possible to employ electrodes 201 and 202 having a substantially circular shape as shown in FIG. 2B, electrodes 203 and 204 having a substantially elliptical shape as shown in FIG. 2C, and flat plate electrodes 205, 206, 207 and 208 having a substantially diamond shape as shown in FIGS. 2D and 2E. Alternatively, it is possible to employ electrodes 209 and 210 having a substantially prismatic shape as shown in FIG. 3A, electrodes 211 and 212 having only outer shell portions 211b and 212b, respectively, in which substantially prismatic inner portions 211a and 212a are hollow as shown in FIG. 3B, electrodes 213 and 214 having substantially a spherical shape as shown in FIG. 3C, electrodes 215 and 216 having only outer shell portions 215b and 216b, respectively, in which substantially spherical inner portions 215a and 216a are hollow as shown in FIG. 3D, electrodes 217 and 218 having substantially a cylindrical shape as shown in FIG. 3E, and electrodes 219 and 220 having only outer shell portions 219b and 220b, respectively, in which substantially cylindrical inner portions 219a and 220a are hollow as shown in FIG. 3F. Further, it is possible to employ flat plate shaped electrodes 221 and 222 in which bent portions 221a and 222a are formed as shown in a perspective view of FIG. 4A and a cross sectional view of FIG. 4B, and electrodes 223 and 224 having a curved shape as shown in a perspective view of FIG. 4C and a cross sectional view of FIG. 4D.

Among the configuration examples shown in FIG. 1 to FIG. 4D, the configuration example employing the electrodes having the shape shown in FIG. 1 will be described below. A total width D of the electrodes 11 and 12 including a distance d1 is set so as to be narrower than a near field represented by $\lambda/2\pi$, where a wavelength of an electric field emitted by these electrodes is A. Similarly, a total width D of the electrodes 21 and 22 including a distance d1 is set so as be narrower than near field represented by $\lambda/2\pi$. A length L of the electrodes 11 and 12 is also set so as to be narrower than the near field represented by $\lambda/2\pi$. A length L of the electrodes 21 and 22 is also set so as to be narrower than the near field represent by $\lambda/2\pi$. A distance d2 between the electrode 11 and the electrode 21 and between the electrode 12 and the electrode 22 is also set so as to be shorter than the near field represented by λ/2π.

The inductors 13 and 14 are configured as, for example, windings of an electrically-conductive wire rod (e.g., a copper wire), and, in the example of FIG. 1, one end of each of the inductors 13 and 14 is electrically connected to an end portion of each of the electrodes 11 and 12. The connection line 15 is an electrically-conductive wire rod (e.g., a copper wire) that connects another end of the inductor 13 with one end of an output terminal of an AC power generating section 17. The connection line 16 is constituted by an electrically-conductive wire rod that connects another end of the inductor 14 with another end of the output terminal of the AC power generating section 17. The connection lines 15 and 16 are constituted by coaxial cables or balanced cables.

The AC power generating section 17 produces an alternating-current power of a predetermined frequency and supplies it to the inductors 13 and 14 through the connection lines 15 and 16.

Similarly to the electrodes 11 and 12, the electrodes 21, 22 are constituted by members having conductivity and are disposed across a predetermined distance d1.

The inductors 23 and 24 are configured as, for example, windings of an electrically-conductive wire rod, and, in the example of FIG. 1, one end of each of the inductors 23 and 24 is electrically connected to an end portion of each of the electrodes 21 and 22. The connection line 25 is an electrically-conductive wire rod (e.g., a copper wire) that connects another end of the inductor 13 with one end of an input terminal of a load 27. The connection line 26 is constituted by an electrically-conductive wire rod that connects another end of the inductor 24 with another end of the input terminal of the load 27. The connection lines 25 and 26 are constituted by coaxial cables or balanced cables.

The load 27 is supplied with electric power which is output from the AC power generating section 17 and transmitted through a power transmission coupler and a power reception coupler. The load 27 is, for example, constituted by a rectifier and secondary battery, or the like. Of course, it may be other than this.

FIG. 5 is a diagram showing an equivalent circuit of the wireless power transmission system 1 shown in FIG. 1. In FIG. 5, impedance 2 represents a characteristic impedance of the connection lines 15, 16 and the connection lines 25, 26, and has a value of Z0. An inductor 3 corresponds to the inductors 13, 14, and has an element value of L. A capacitor 4 has an element value (C−Cm) obtained by subtracting an element value Cm of a capacitor produced between the electrodes 11, 12 and the electrodes 21, 22 from an element value C of a capacitor produced between the electrodes 11 and 12. A capacitor 5 represents a capacitor produced between the electrodes 11, 12 and the electrodes 21, 22, and has an element value of Cm. A capacitor 6 has an element value (C−Cm) obtained by subtracting an element value Cm of a capacitor produced between the electrodes 11, 12 and the electrodes 21, 22 from an element value C of a capacitor produced between the electrodes 21 and 22. An inductor 7 corresponds to the inductors 23 and 24, and has an element value of L.

FIG. 6 shows frequency characteristics of an S parameter between the power transmitting device 10 and the power receiving device 20. Specifically, a horizontal axis of FIG. 6 represents frequency and a vertical axis represents insertion loss (S21) from the power transmitting device 10 to the power receiving device 20. As shown in FIG. 6, the insertion loss from the power transmitting device 10 to the power receiving device 20 has an antiresonance point at frequency fC and has resonance points at frequencies fL and fH. Here, frequency fC is determined by inductance values L of the inductors 3, 7 shown in FIG. 5 and the capacitance values C of the capacitors formed by the electrodes 11 and 12 or the electrodes 21 and 22. The frequencies fL and fH are determined by the inductance values L of the inductors 3 and 7 shown in FIG. 5, the capacitance value Cm of the capacitor formed by the electrodes 11, 12 and the electrodes 21, 22, as well as the capacitance value C of the capacitors produced between the electrodes 11, 12 and between the electrodes 21, 22, respectively.

A frequency of an alternating-current power produced by the AC power generating section 17 is configured to be substantially equal to the resonance frequency of the power transmission coupler constituted by first and second electrodes 11 and 12 and the inductors 13 and 14. By setting the frequency of the AC power generating section 17 in such a manner, electric power can be efficiently transmitted from the power transmitting device 10 to the power receiving device 20.

Further, the capacitance value C is determined by a size, a shape and an arrangement of electrodes of each of the power transmission coupler and the power reception coupler. The capacitance value Cm depends on a distance d2 between the power transmission and reception electrodes in addition to the size, the shape and the arrangement of the electrodes of each coupler. Therefore, input impedance from the AC power generating section 17 side in the equivalent circuit of FIG. 5 varies depending on the size, the shape, and the arrangement of the electrodes and the distance between the power transmission and reception electrodes. When the characteristic impedance Z0 of the AC power generating section 17 side corresponds to the input impedance and they are matched, electric power transmission efficiency becomes maximum, and conditions for this depends on the size, the shape, and the arrangement of the electrodes and the distance between the power transmission and reception electrodes.

Therefore, based on the size, the shape and the arrangement of the electrodes and the distance between the power transmission and reception electrodes, the frequency of the alternating-current power produced by the AC power generating section 17 may be set to a frequency at which the transmission efficiency of the electric power from the power transmission coupler to the power reception coupler becomes maximum. By setting the frequency in such a manner, transmission efficiency can be maximized.

With the embodiment shown in FIG. 1 of such a configuration, the electrodes 11 and 12 of the power transmitting device 10 and the electrodes 21 and 22 of the power receiving device 20 are coupled with electric field resonance, and an alternating-current power is transmitted from the electrodes 11 and 12 of the power transmitting device 10 to the electrodes 21 and 22 of the power receiving device 20 using an electric field.

That is, in the embodiment shown in FIG. 1, since the electrodes 11, 12 of the power transmitting device 10 and the electrodes 21, 22 of the power receiving device 20 are disposed across a distance d2 which is shorter than λ/2π which is within a range of a near field, the electrodes 21 and 22 are disposed in a region where an electric field components emitted from the electrodes 11 and 12 are dominant. Further, a resonance frequency due to the capacitor formed between the electrodes 11 and 12 and the inductors 13 and 14 and a resonance frequency due to the capacitor formed between the electrodes 21 and 22 and the inductors 23 and 24 are configured to be substantially equal. In such a manner, since the electrodes 11 and 12 of the power transmitting device 10 and the electrodes 21 and 22 of the power receiving device 20 are electric field resonance coupled, an alternating-current power is transmitted from the electrodes 11 and 12 of the power transmitting device 10 to the electrodes 21 and 22 of the power receiving device 20 efficiently using an electric field.

(B) Illustration of Configuration of Embodiments

Figure 7:
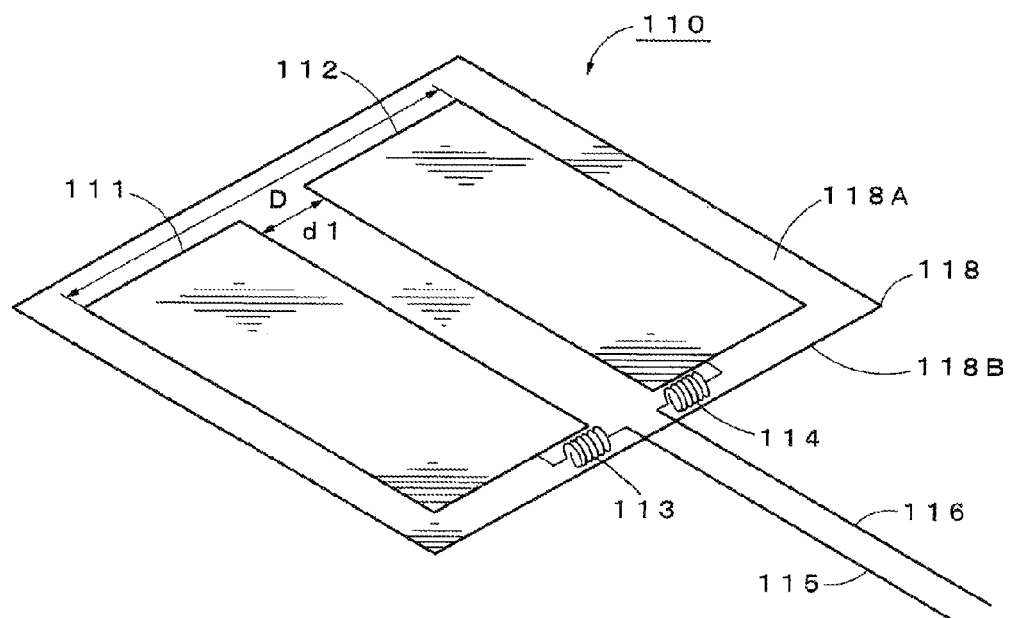
FIG. 7 is a diagram showing a configuration example of a power transmission coupler of the embodiment of the present disclosure.
Figure 8:
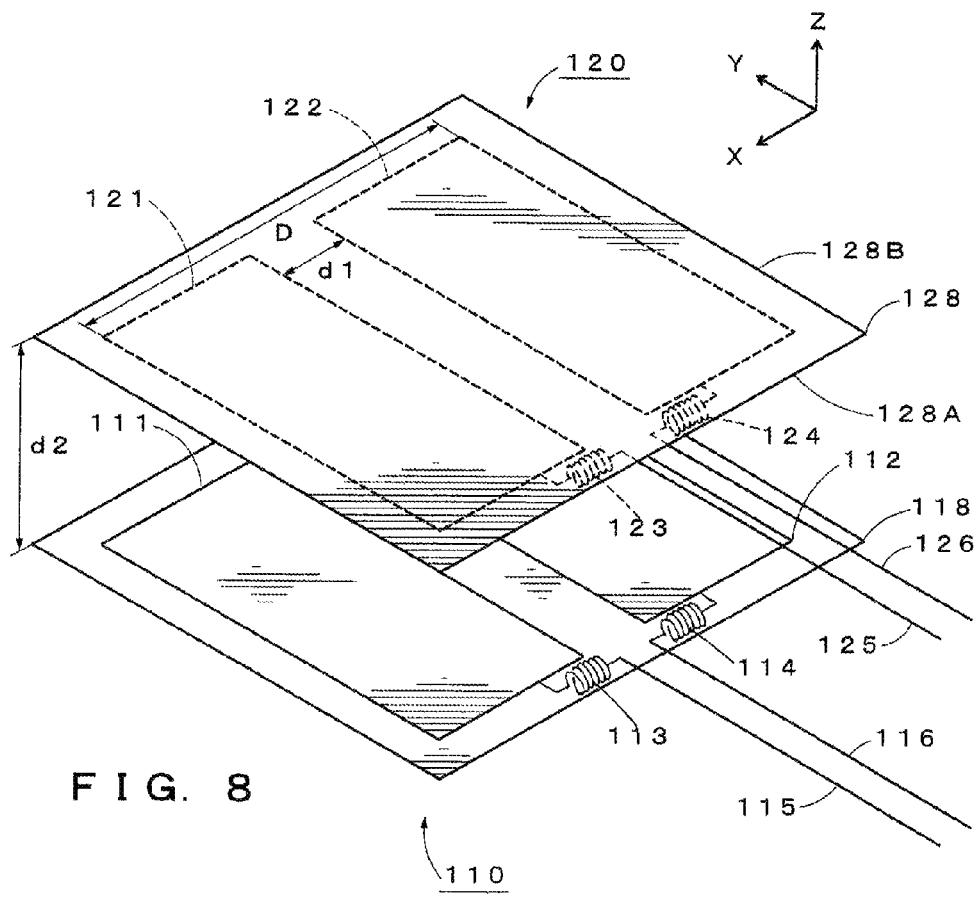
FIG. 8 is a diagram showing a configuration example of a power transmission coupler and a power reception coupler of the embodiment of the present disclosure.

FIGS. 7 and 8 are perspective views showing configuration examples of the embodiment of the present disclosure. FIG. 7 shows a configuration example of the power transmission coupler 110 of the embodiment. FIG. 8 is a perspective view showing a state where the power transmission coupler 110 and the power reception coupler 120 are arranged.

As shown in FIG. 7, the power transmission coupler 110 includes electrodes 111 and 112, which are conductive members having a rectangular shape, disposed on a front face 118A of a circuit board 118, which is an insulating member having a rectangular plate shape. In the example of FIG. 7, no electrodes are disposed on a back face 118B of the circuit board 118. For example, as a specific configuration example, the electrodes 111 and 112 are formed on the circuit board 118 of a glass epoxy substrate or a glass composite substrate by an electrically-conductive film, such as copper. The electrodes 111 and 112 are disposed in parallel at positions spaced apart by a predetermined distance d1. Width D of the electrodes 111, 112 including a distance d1 is set so as to be narrower than a near field expressed as $\lambda/2\pi$, where $\lambda$ is a wavelength of an electric field emitted from the electrodes.

One end of each of the inductors 113, 114 is connected to an end portion in a shorter direction of the electrodes 111, 112 of the circuit board 118, respectively. The other ends of the inductors 113, 114 are connected to one ends of the connection lines 115, 116, respectively. The connection lines 115, 116 are disposed in such a manner that they avoid regions of the electrodes 111, 112 and a region interposed therebetween and are disposed in a direction (bottom right direction in FIG. 7) extending away from those regions. More specifically, they are disposed in such a manner that they avoid respective rectangular regions of the electrodes 111, 112 and a region interposed between the two electrodes 111, 112 and are disposed in a direction extending away from those regions. With such an arrangement, since interference between the electrodes 111, 112 and the connection lines 115, 116 can be decreased, a decrease in transmission efficiency can be prevented. The connection lines 115, 116 are, for example, constituted by coaxial cables or balanced cables. Note that the other end of each of the connection lines 115, 116 is connected to an output terminal of the AC power generating section, not to illustrate, respectively. The power transmitting device includes the AC power generating section connected to the power transmission coupler 110 via the connection lines 115, 116.

The circuit board 118 does not need to be a rigid body, and, for example, may be a dielectric film such as polyimide. Since such a dielectric film has flexibility, an electrode portion can be rolled up or folded in accordion shape when not in use, and can improve ease of transportation and ease of store of the electrode portion.

Figure 9:
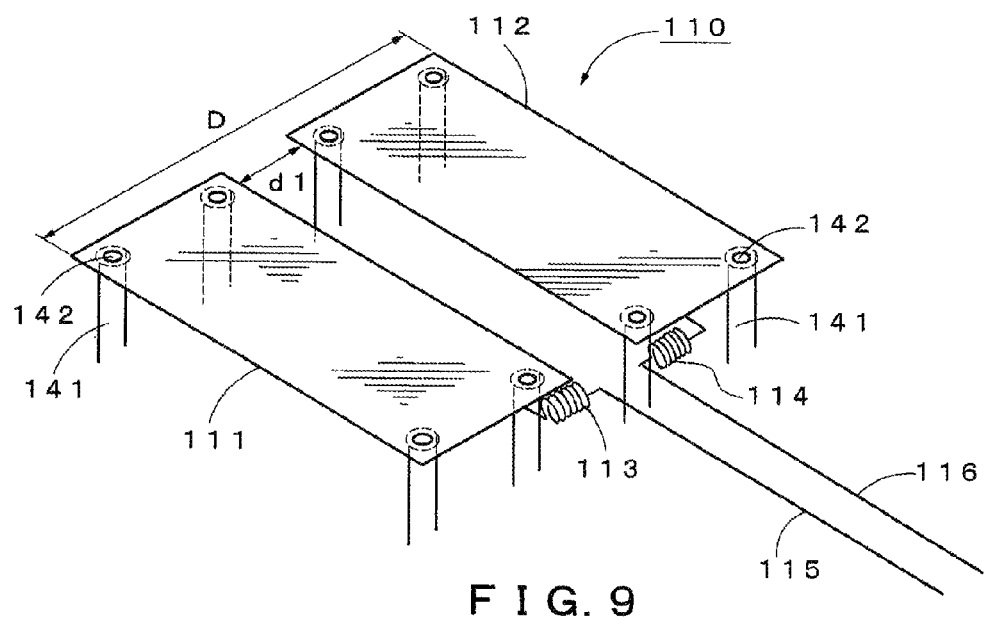
FIG. 9 is a diagram showing an example of a supporting structure of the electrodes of the power transmission coupler of the embodiment of the present disclosure.

The electrodes may be provided with rigidity and secured to a housing without a supporting substrate such as the circuit board 118. FIG. 9 is a configuration example of the power transmission coupler 110, and the electrodes 111 and 112 are secured to dielectric supports 141 by screws 142. The dielectric support 141 is configured to be secured to a coupler installation housing, not shown, by a screw. With such a configuration shown in FIG. 9, the dielectric supports 141 may be installed by a number capable of stably securing the electrodes 111, 112 to the housing. A similar configuration can be applied to a power receiving side coupler.

Figure 10A:
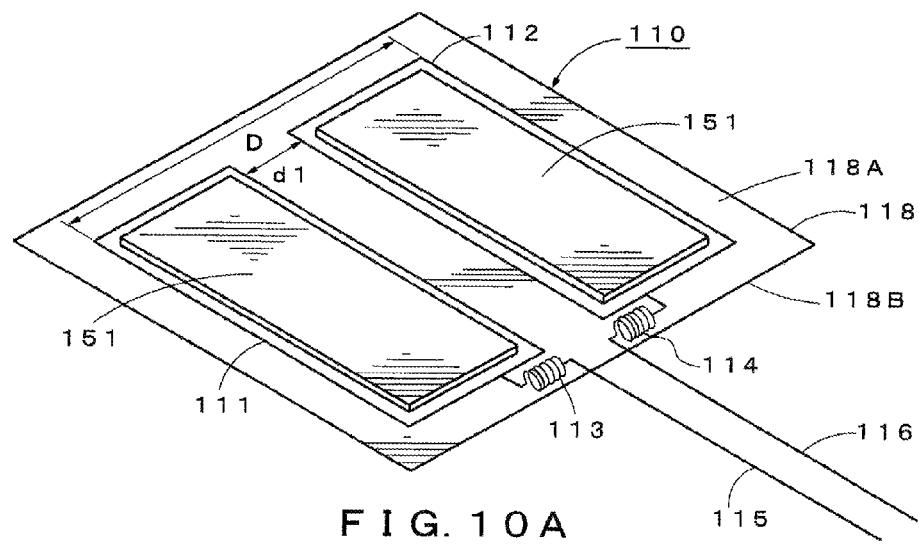
FIG. 10A is a perspective view showing an example of an installation configuration of a radiation fin of the power transmission coupler of the embodiment of the present disclosure.
Figure 10B:
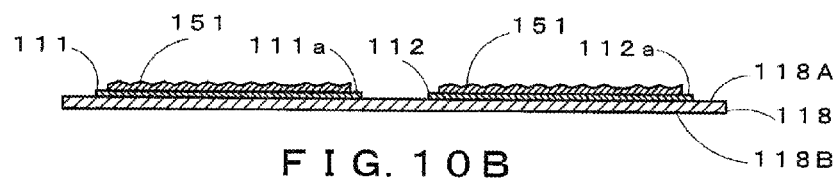
FIG. 10B is a cross sectional view of the installation configuration shown in FIG. 10A.
Figure 10C:
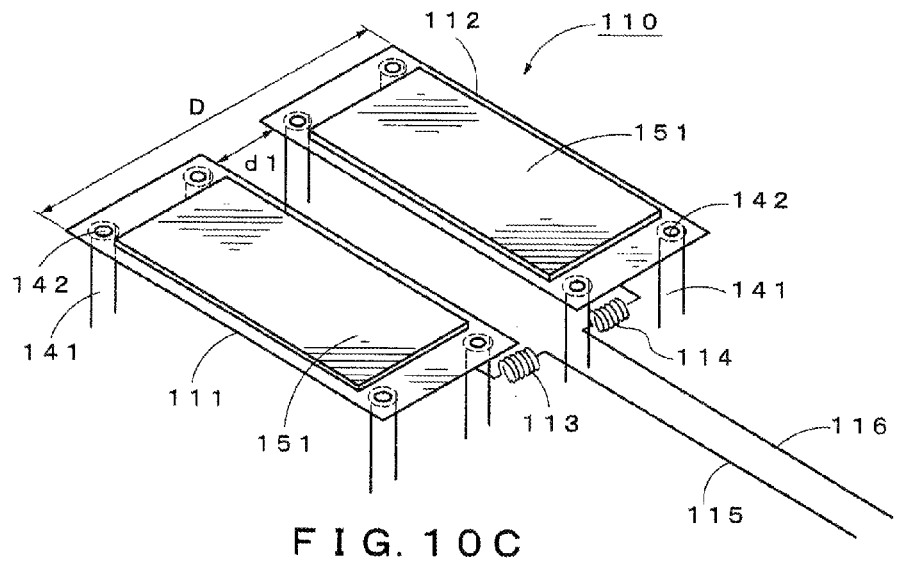
FIG. 10C is a diagram showing an example of another installation configuration of the radiation fin of the power transmission coupler of the embodiment of the present disclosure.

Further, a fin for dissipating heat may be disposed on the electrodes 111, 112 to dissipate heat during electric power transmission. The perspective view of FIG. 10A and the cross sectional view of FIG. 10B show an example in which a radiation fin 151 is provided which has an increased surface area by forming raised and recessed portions continuously in an in-plane direction on surfaces 111a, 112a of the electrodes 111, 112 of FIG. 7. During electric power transmission, although heat is produced mainly due to an alternating-current resistance of the coils 113, 114, the heat produced can be dissipated from the radiation fin 151 provided on surfaces 111a, 112a of the electrodes 111, 112. Such a configuration has an effect in preventing thermal destruction of the coupler. FIG. 10C is an example in which, in a configuration of FIG. 9, the radiation fin 151 is disposed on the surfaces 111a, 112a of the electrodes 111, 112, and the electrodes 111, 112 are secured to the dielectric supports 141 with screws 142, with which an effect similar to that of the configuration of FIG. 10A can be obtained. In the configuration of FIGS. 10A and 10C, it is possible to provide the radiation fin 151 on back faces which are opposite the front faces 111a, 112a of the electrodes 111, 112.

As another heat dissipation measures, a coolant may be enclosed inside the electrodes 111 and 112. For example, by enclosing a coolant inside the electrodes 211, 212, 215, 216, 219 and 220 each having a three-dimensional structure having only an outer shell portions as shown in FIG. 3B, FIG. 3D and FIG. 3F, heat produced mainly due to an alternating-current resistance of the coils 113 and 114 during electric power transmission can be dispersed across an exposed surface of the electrodes 211, 212, 215, 216, 219 and 220 by convection of the coolant and can release heat from the exposed surface.

Figure 11:
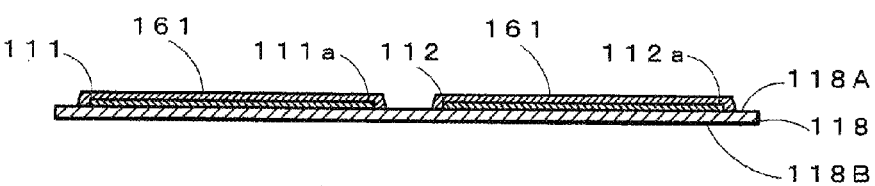
FIG. 11 is a diagram showing an example of a configuration of an insulating coating of the power transmission coupler of the embodiment of the present disclosure.

Further, as anti-corrosion measures, it is desirable that the electrodes 111 and 112 are protected by a dielectric film provided on surfaces 111a and 112a thereof. In the power transmitting side coupler shown in FIGS. 7 and 9, with an insulating coating provided on an exposed surface of the electrode portions 111, 112 by a resist material or the like, a decrease in electric power transmission efficiency due to corrosion of the electrodes 111, 112 can be prevented. FIG. 11 shows an example of a case in which a coating is applied on the surfaces 111a and 112a which are the exposed surfaces of the electrodes 111 and 112 in a configuration shown in FIG. 7, and shows a cross-section of the circuit board 118 and the electrodes 111, 112. That is, the surfaces 111a and 112a, which are the exposed surfaces of the electrodes 111 and 112, are covered with an insulating film 161. A similar coating is also applicable to a configuration as shown in FIG. 9 in which there is no dielectric substrate, and an entirety of the exposed surfaces of the electrodes 111 and 112 may be coated with an insulating film. Also, in a case where the radiation fin 151 shown in FIGS. 10A and 10C is provided on the electrodes 111 and 112, a decrease in electric power transmission efficiency due to the corrosion of the electrodes 111, 112 can be suppressed by coating, with an insulating film, a portion where the electrodes 111 and 112 are exposed by extending beyond the radiation fin 151 or by coating, with an insulating film, the electrodes 111, 112 and the radiation fin 151 as a whole. By coating the electrodes 111, 112 with the insulating film 161, even if a high voltage is applied between the electrodes 111 and 112, discharging from surfaces of the electrodes 111 and 112 can be suppressed. Note that the electrodes can be coated with an insulating film even if they have a three dimensional structure as shown in FIG. 3A to FIG. 3F.

The power transmission coupler 110 constitutes a series resonant circuit with a capacitance C of a capacitor formed by the electrodes 111 and 112 disposed across a predetermined distance d1 and an inductance L of the inductors 113 and 114, and thus has a natural resonance frequency fC based on them.

The power reception coupler 120 has a configuration similar to the power transmission coupler 110, in which electrodes 121 and 122, which are conductive members having a rectangular shape, disposed on a front face 128A of a circuit board 128, and connection lines 125 and 126 are connected to the another ends of the inductors 123 and 124. Resonance frequency fC of a series resonant circuit by capacitance C of the capacitor formed by the electrodes 121 and 122 and inductance L of the inductors 123 and 124 is substantially the same as that of the power transmission coupler 110. The connection lines 125 and 126 are, for example, constituted by coaxial cables or balanced cables. A load, not shown, is connected to the other end of the connection lines 125 and 126 of the power reception coupler 120. The power receiving device includes a load connected to the power reception coupler 120 via the connection lines 125, 126.

FIG. 8 is a diagram showing a state where the power transmission coupler 110 and the power reception coupler 120 are disposed opposing each other. As shown in this diagram, the power transmission coupler 110 and the power reception coupler 120 are disposed across a distance d2 in such a manner that the front faces 118A, 128A of the circuit boards 118, 128 oppose each other and the circuit boards 118 and 128 are parallel to each other.

An operation of the embodiment shown in FIG. 8 will now be described. FIG. 12 is a graph showing a frequency characteristic of transmission efficiency η21 (=|S21|$^2$) from the power transmission coupler 110 to the power reception coupler 120 in a case where the power transmission coupler 110 and the power reception coupler 120 of the embodiment shown in FIG. 8 are disposed opposing each other at an interval of 14 cm (a case where d2=14 cm). In this graph, a horizontal axis represents a frequency (MHz) of a alternating-current power to be transmitted and a vertical axis represents transmission efficiency. With an example shown in FIG. 12, it can be seen that transmission efficiency of greater than or equal to 80% is achieved around 25 MHz.

FIG. 13 is a graph showing a frequency characteristic of an S parameter between the power transmission coupler 110 and the power reception coupler 120 in a case where the power transmission coupler 110 and the power reception coupler 120 are disposed opposing each other at an interval of 17 cm (a case where d2=17 cm). In this graph, a solid line represents a frequency characteristic of an absolute value of the parameter S21, and a broken line represents a frequency characteristic of an absolute value of the parameter S11. Here, the parameter S11 represents reflection of a signal inputted from the power transmission coupler 110, and the parameter S21 represents passage of a signal from the power transmission coupler 110 to the power reception coupler 120. As shown in FIG. 13, near 27 MHz, a value of the parameter S21 is around 0.9 and a value of the parameter S11 is around 0.1. Therefore, according to the present embodiment, it can be seen that, around 27 MHz, the signal inputted from the power transmission coupler 110 is transmitted to the power reception coupler 120 with less reflection.

FIG. 14 is a graph showing a frequency characteristic of transmission efficiency η21 (=|S21|$^2$) from the power transmission coupler 110 to the power reception coupler 120 in a case where the power transmission coupler 110 and the power reception coupler 120 are disposed opposing each other at an interval of 17 cm (a case where d2=17 cm). As shown in this graph, it can be seen that, when the frequency is near 27 MHz, transmission efficiency is around 80%.

FIGS. 15 and 16 show Smith charts of an impedance S11 of the power transmission coupler 110 and an impedance S22 of the power reception coupler 120 in a case where the power transmission coupler 110 and the power reception coupler 120 are disposed opposing each other at an interval of 17 cm (a case where d2=17 cm). In this case, a port impedance of a measuring device is set at a value equal to a characteristic impedance Z0 (real number) of the connection line. As shown in these diagrams, in the present embodiment, since loci of the impedances of the power transmission coupler 110 and the power reception coupler 120 pass near a center of a circle of the Smith chart,-reflection can be suppressed and electric power can be transmitted efficiently by setting such that transmission is performed near the center.

FIGS. 17 and 18 are graphs showing frequency characteristics of each of a real part (Re [Zin1]) and an imaginary part (Im [Zin1]) of the impedance of the power transmission coupler 110 and a real part (Re [Zin2]) and an imaginary part (Im [Zin2]) of the impedance of the power reception coupler 120 in a case where the power transmission coupler 110 and the power reception coupler 120 are disposed opposing each other at an interval of 17 cm (a case where d2=17 cm). As shown in these drawings, since the imaginary part of each of the impedances is substantially zero near 27 MHz, which is a resonance frequency, it can be seen that an electric power can be transmitted from the power transmission coupler 110 to the power reception coupler 120 with a reduced loss.

FIGS. 19 and 20 show voltage standing-wave ratios (VSWR) of the power transmission coupler 110 and the power reception coupler 120, respectively, in a case where the power transmission coupler 110 and the power reception coupler 120 are disposed opposing each other at an interval of 17 cm (a case where d2=17 cm). As shown in these drawings, since the voltage standing-wave ratios of the power transmission coupler 110 and the power reception coupler 120 are substantially 1 near 27 MHz, which is a resonance frequency, impedance is matched from an AC power generating section, not shown, to the power transmission coupler 110, or from the power reception coupler 120 to a load, not shown, and it can be seen that an electric power can be transmitted without reflection.

As has been described above, according to the present embodiment, in a case where the power transmission coupler 110 and the power reception coupler 120 are disposed at an interval of, for example, about 17 cm, since transmission efficiency of around 80% can be achieved, an electric power can be transmitted efficiently. Also, it can be seen that, at the resonance frequency, a resistance component of the impedance becomes substantially 0, and that there is less reflection.

Figure 22:
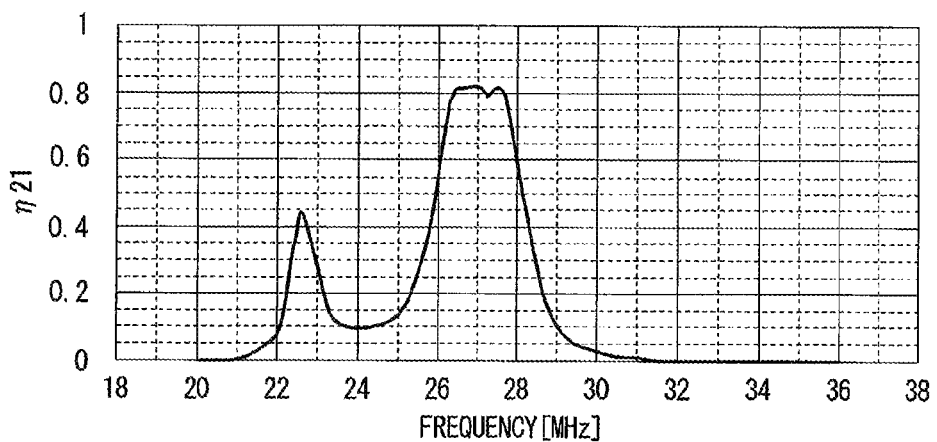
FIG. 22 is a graph showing frequency characteristics of the transmission efficiency of the embodiment shown in FIG. 8.
Figure 23:
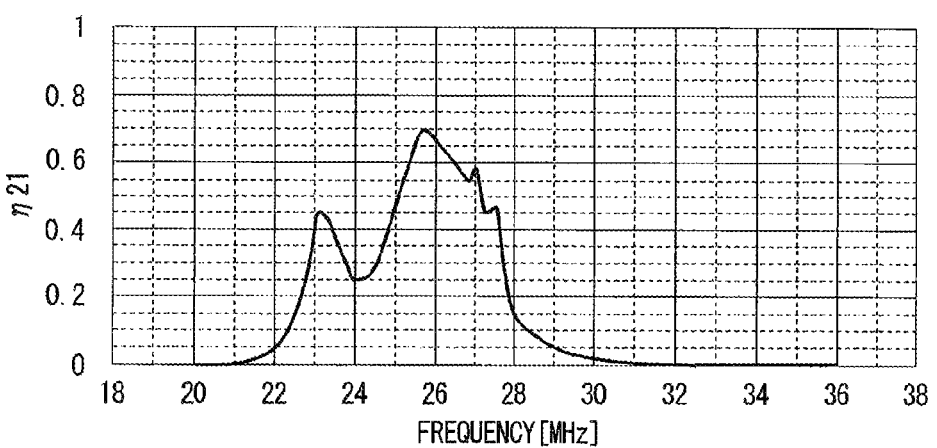
FIG. 23 is a graph showing frequency characteristics of the transmission efficiency of the embodiment shown in FIG. 21.

In the embodiment shown in FIG. 8, the connection lines 115, 116 and the connection lines 125, 126 are disposed to avoid regions of the electrodes 111, 112 and the electrodes 121, 122 and a region interposed between these regions, and, for example, as shown in FIG. 21, in a case where the region (the region interposed between the electrodes 111, 112 and the electrodes 121, 122 in an example of FIG. 21) is not avoided and disposed so as to pass through the region, transmission characteristic deteriorates as shown in FIGS. 22 and 23. That is, in a case where the connection lines 115 and 116 are disposed in a region interposed between the electrodes 111 and 112, and the connection lines 125 and 126 are disposed in a region interposed between the electrodes 121 and 122 as shown in FIG. 21, characteristics shown in FIG. 22 (characteristics in a case where they are disposed as shown in FIG. 8) deteriorates as shown in FIG. 23, and the transmission characteristic at a peak decreases from about 0.8 to 0.7.

Also, in a case where the connection lines 115 and 116 are disposed to pass directly above or in the vicinity of the electrodes 111, 112, the transmission characteristics deteriorate in a similar to the case of FIG. 21. Therefore, it is desirable that the connection lines 115 and 116 are disposed at positions separate from the electrodes 111, 112, and disposed to extend in a direction away from them. Of course, the connection lines 125 and 126 are disposed in a similar manner.

That is, in the present embodiment, since one end of each of the inductors 113, 114 and the inductors 123, 124 is connected to an end portion of each of the electrodes 111, 112 and the electrodes 121, 122 proximately to each other, connection of the connection lines 115, 116 and the connection line 125, 126 can be facilitated. Also, with such an arrangement, since the connection lines 115, 116 and the connection lines 125, 126 can be disposed at positions separate from the electrodes 111, 112 and the electrodes 121, 122, a decrease in transmission efficiency can be prevented. Note that the inductors 123, 124 may be disposed at a region interposed between the electrodes 111, 112 and the electrodes 121, 122, and the connection line 115, 116 and the connection line 125, 126 may extend in a direction normal to the circuit board 118 and the circuit board 128.

(C) Explanation of Variant Embodiment

The above-mentioned embodiment is given by way of example, and the present disclosure is by no means limited to the case described above. For example, in the above-mentioned embodiment, the electrodes 111, 112 and the electrodes 121, 122 are of the same size, but these may be of different sizes. Specifically, the electrodes 121, 122 may be of a size smaller than the size of the electrodes 111, 112. Of course, an opposite configuration may be employed.

Figure 24:
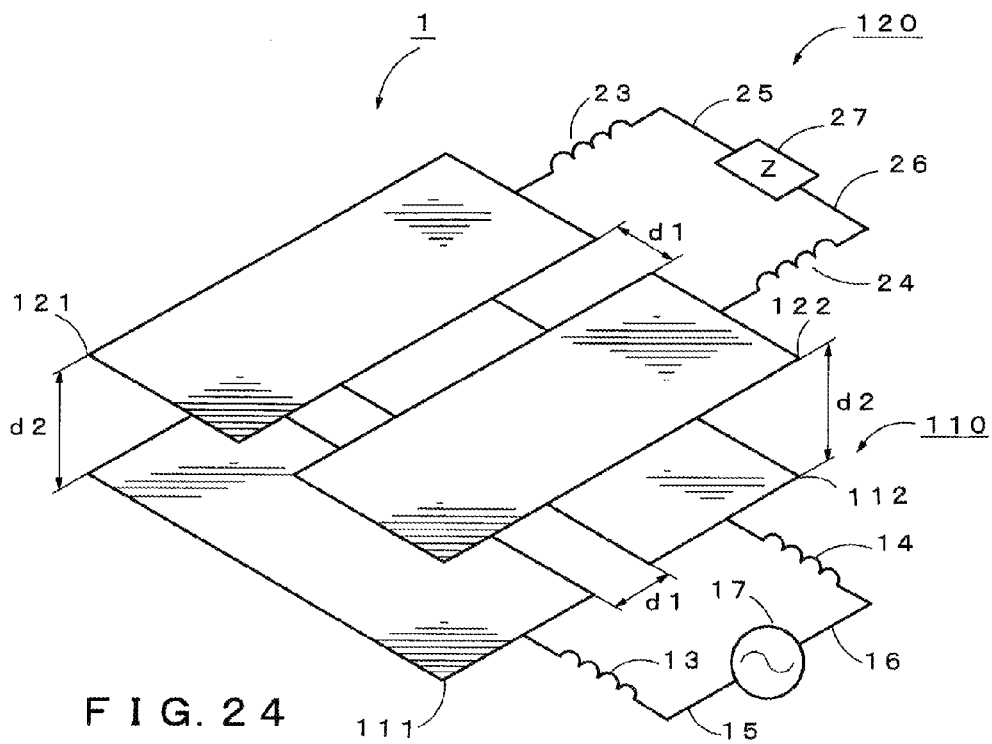
FIG. 24 is a diagram showing an arrangement example of the electrodes.

Also, in the above-mentioned embodiment, the electrodes 111, 112 and the electrodes 121, 122 are disposed opposing each other, but, for example, these may be disposed in a state displaced in an X-direction or a Y-direction shown in FIG. 8. Alternatively, the power transmission coupler 110 and the power reception coupler 120 may be arranged in such a manner that they are rotated through a predetermined angle with respect to each other. In such a case, as shown in FIG. 24, in a case where the power transmission coupler 110 and the power reception coupler 120 are arranged in such a manner that they are rotated through 90 degrees or 270 degrees with respect to each other, electric power is not transmitted from the power transmission coupler 110 to the power reception coupler 120. That is, since a voltage produced in the power reception coupler 120 will be cancelled out in a case where a capacity between the electrode 121 and the electrode 111 and a capacity between the electrode 121 and the electrode 112 are equal, or a capacity between the electrode 122 and the electrode 111 and a capacity between the electrode 122 and the electrode 112 are equal, it is desirable that a positional relationship between the electrodes is adjusted not to become such a state. For example, with a mutual rotation angle being within less than ±15 degrees, a relative decrease in transmission efficiency due to the rotation can be suppressed to less than 10%.

With the above-mentioned configuration, the shape of the electrodes 111, 112 and the electrodes 121, 122 need not be a rectangular shape. For example, the electrodes 111, 112 and the electrodes 121, 122 may be flat plate electrodes having a circular shape, an elliptical shape or a diamond shape as shown in FIGS. 2A to 2E, or a prism, a sphere, a cylinder, or a three-dimensional shape having only an outer shell portion thereof as shown in FIGS. 3A to 3F, and alternatively, electrodes having a shape that is not a simple flat plate but a curved shape or bent shape obtained from a flat plate as shown in FIGS. 4A to 4D. As long as the configuration includes two electrodes disposed at a certain distance to form a capacitor, there is no essential difference in a principle of operation of electric power transmission as compared to the case of the electrode structure shown in FIG. 1 and thus it is applicable to the present disclosure.

The inductors 113, 114 and the inductors 123, 124 are interposed between the electrodes 111, 112 and the electrodes 121, 122 and the connection lines 115, 116 and the connection lines 125, 126, but it is possible to interpose them at positions other than such positions (e.g., in the vicinity of the AC power generating section or in the vicinity of the load). In the above-mentioned embodiment, the power transmission coupler 110 and the power reception coupler 120 are provided with two each of the inductors 113, 114 and the inductors 123, 124, respectively, but may be each provided with a single inductor.

In the above-mentioned embodiment, an inductor was configured as a conductor wire which is wound cylindrically, but may be, for example, configured as a shape meandering on a plane or a spiral shape on a plane such as those used in a microstripline.

Further, an inductor may be formed integral with the electrodes 111, 112 on the circuit board 118 or on a film. In such a case, except for a connector connecting portion, a coupler can be rolled up or folded in an accordion manner when not in use, and it is possible to increase transportation property and storing property of the coupler.

Figure 25:
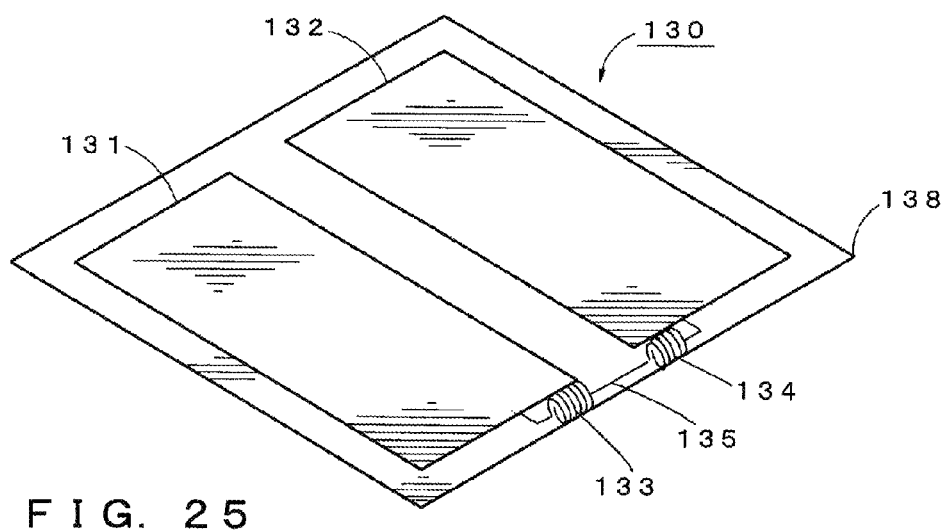
FIG. 25 is a diagram showing a configuration example of a coupler for relay of the embodiment of the present disclosure.
Figure 26:
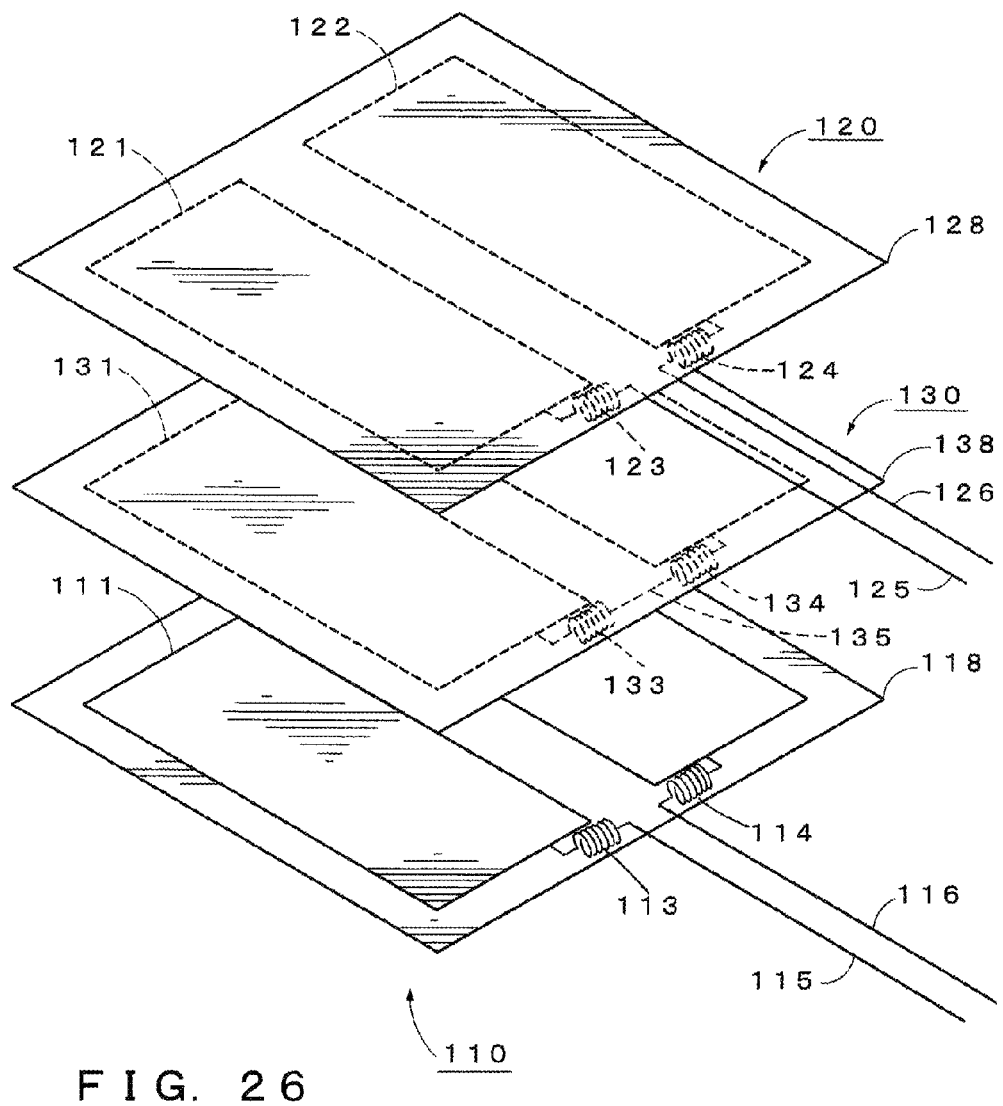
FIG. 26 is an arrangement example of the coupler for relay shown in FIG. 25.

In the above-mentioned embodiment, the configuration includes the power transmission coupler 110 and the power reception coupler 120, but may be a configuration that has a relay coupler 130 as shown in FIG. 25. The relay coupler 130 shown in FIG. 25 is configured such that other ends of the inductors 133, 134 of the coupler having a configuration similar to FIG. 7 are connected with each other by the connection line 135. Of course, these inductors 133, 134 may be configured as a single inductor. Note that a resonance frequency fC of the relay coupler 130 is set to be substantially the same as those of the power transmission coupler 110 and the power reception coupler 120. FIG. 26 shows a configuration example of the wireless power transmission system using such a relay coupler 130. In this example, the relay coupler 130 is disposed between the power transmission coupler 110 and the power reception coupler 120 so as to be parallel to the two couplers. According to such a configuration, electric power can be transmitted through a greater distance and more efficiently as compared to a case in which the relay coupler 130 is not used.

In the above-mentioned embodiment, a case in which the respective electrodes are disposed substantially in parallel or a configuration according to this was explained. However, besides the configuration shown in FIG. 1 in which the electrodes 11, 12 on a power transmitting side and the electrodes 21, 22 on a power receiving side are opposed to each other in a face-to-face direction, respectively, an electric power transmission function similar to the above can be achieved by, for example, arranging edges of the respective electrodes to oppose each other on the power transmitting side and the power receiving side. For example, FIG. 27 shows a configuration in which, in the configuration shown in FIG. 1, the electrodes 11, 12 on the power transmitting side are opposed, the electrodes 21, 22 of the power receiving side are opposed, and further, an edge 11*a* of the electrode 11 and an edge 21*a* of the electrode 21 are arranged so as to oppose each other across a distance d2 and an edge 12*a* of the electrode 12 and an edge 22*a* of the electrode 22 are arranged so as to oppose each other across the same distance d2. FIG. 28 shows a configuration in which, in configuration shown in FIG. 1, each electrode is opposed in an order of all electrodes 11, 12, 21 and 22 while being superimposed spatially. In the configurations shown in FIGS. 27 and 28, electric power can be transmitted from the power transmitting side to the power receiving side through an electric field produced between the electrodes similarly to the configuration shown in FIG. 1.

As well as the configuration shown in FIGS. 27 and 28, it is possible to transmit electric power from the power transmitting side to the power receiving side through an electric field produced between the electrodes by employing, for example, configurations shown in FIGS. 29 and 30.

That is, FIG. 29 shows a configuration in which, in the configuration shown in FIG. 1, electrodes 11, 12 of a curved shape are opposed to form a tubular structure 230, electrodes 21, 22 of a curved shape are opposed to form a tubular structure 240, and these structures are disposed substantially concentrically by inserting the tubular structure 230 inside the tubular structure 240. Also, in the configuration shown in FIG. 29, a slit 231 separating the electrodes 11 and 12 of the power transmitting side coupler and a slit 241 separating the electrodes 21 and 22 of the power receiving side coupler are opposed to ensure the coupling of the electric field. Such a configuration shown in FIG. 29 may be used in applications such as an arm or a joint of a robot since electric power can be transmitted even if the coupler is slid in an axial direction.

Particularly, in the configuration shown in FIG. 29, a coupling capacity between the couplers changes by sliding the tubular structure 240 with respect to the tubular structure 230 in an axial direction, the input impedance can be adjusted. Also, by making a length in an axial direction of the tubular structure 230 of the power transmitting side coupler and the tubular structure 240 of the power receiving side coupler smaller, since a relative slide in the axial direction of the coupler having a reduced length does not cause a change in the coupling capacity of the couplers, it may be used in applications such as performing electric power transmission of a fixed quantity in a sliding mechanism system. Note that it is not limited to the configuration shown in FIG. 29, and, as long as both tubular structures of the power transmitting side and the power receiving side are disposed substantially concentrically, for example, the tubular structure of the power receiving side may be inserted inside the tubular structure of the power transmitting side.

FIG. 30 shows a configuration in which, in the configuration shown in FIG. 1, the electrodes 21, 22 each having a tubular shape of a diameter smaller than a diameter of the electrodes 11, 12 are disposed concentrically in the electrodes 11, 12 having a tubular shape. Also, in the configuration shown in FIG. 30, a slit 231 separating the electrodes 11 and 12 of the power transmitting side coupler and a slit 241 separating the electrodes 21 and 22 of the power receiving side coupler are opposed from a point of view of ensuring the coupling of the electric field. Further, in the configuration shown in FIG. 30, since the electrode 11 and the electrode 12 are disposed in an axially symmetrical manner, and the electrode 21 and the electrode 22 are similarly disposed in an axially symmetrical manner, even if the power transmitting side coupler and the power receiving side coupler rotate with respect to each other, there is no change in the coupling capacity between the couplers, and thus it can be used in applications such as performing electric power transmission of a fixed quantity in a rotating mechanism system. Also, in the configuration shown in FIG. 30, a configuration in which each electrode has an opening that broadens or narrows in a funnel shape towards the slit 231, 241 side is also applicable.

Also, in the configuration shown in FIG. 30, the electrodes 21, 22 on the power receiving side have diameters smaller than those of the electrodes 11, 12 of the power transmitting side, but it is not limited thereto, and a diameter of the electrodes on the power transmitting side may be made smaller than that of the power receiving side, and the electrodes on the power transmitting side may be placed in the electrodes of the power receiving side in a concentric manner.

The electrode configuration exemplified in FIGS. 27 to 30 described above is a configuration in which the electrodes 11, 12 of the power transmitting side and the electrodes 21, 22 of the power receiving side have a constant distance and respectively form a capacitor, and there is no essential difference between the electrode configuration shown in FIG. 1 and the principle of operation during electric power transmission. Also, in any configuration exemplified in FIGS. 27 to 30, similarly to the electrode configuration shown in FIG. 1, conditions on an electrode size of the power transmitting side and the power receiving side may be made different.

What is claimed is:

1. A wireless power transmission system that wirelessly transmits alternating current power from a power transmitting device to a power receiving device, the wireless power transmission system comprising:
   the power transmitting device including:
   first and second electrodes spaced apart by a predetermined distance, the first and second electrodes having a total width, including the predetermined distance, of less than or equal to $\lambda/2\pi$, which is a near field range;
   a first connection line that electrically connects the first electrode and one of two output terminals of an alternating current power generating section;
   a second connection line that electrically connects the second electrode and the other of two output terminals of the alternating current power generating section; and
   at least one first inductor that is interposed between the first and second electrodes and at least one of the two output terminals of the alternating current power generating section,
   the power receiving device including:
   third and fourth electrodes spaced apart by a predetermined distance, the third and fourth electrodes having a total width, including the predetermined distance, of less than or equal to $\lambda/2\pi$, which is a near field range;
   third connection line that electrically connects the third electrode and one of two input terminals of a load;
   a fourth connection line that electrically connects the fourth electrode and the other of two input terminals of the load; and at least one second inductor that is interposed between the third and fourth electrodes and at least one of the two input terminals of the load,
a coupler including the first and second electrodes and the at least one first inductor forms one resonant circuit and a coupler including the third and fourth electrodes and the at least one second inductor forms another resonant circuit,
a resonance frequency of the coupler including the first and second electrodes and the at least one first inductor and a resonance frequency of the coupler including the third and fourth electrodes and the at least one second inductor being configured to be equal, the first and second electrodes and the third and fourth electrodes being spaced apart by a distance of less than or equal to $\lambda/2\pi$, which is a near field range, and
wherein the first and second electrodes and the third and fourth electrodes are coupled with electric field resonance so that the alternating current power is transmitted from the first and second electrodes of the power transmitting device to the third and fourth electrodes of the power receiving device by use of an electric field.

2. The wireless power transmission system according to claim 1, wherein the first to fourth electrodes have a flat plate shape.

3. The wireless power transmission system according to claim 2, wherein the first and second electrodes and the third and fourth electrodes are disposed in the same plane.

4. The wireless power transmission system according to claim 3, wherein the first and third electrodes and the second and fourth electrodes are disposed in parallel.

5. The wireless power transmission system according to claim 1, wherein
the first and second connection lines are disposed in such a manner that regions of the first and second electrodes and a region interposed therebetween are avoided and in a direction extending away from the regions.

6. The wireless power transmission system according to claim 1, wherein
the third and fourth connection lines are disposed in such a manner that regions of the third and fourth electrodes and a region interposed therebetween are avoided and in a direction extending away from the regions.

7. The wireless power transmission system according to claim 1, further comprising:
a relay device including:
fifth and sixth electrodes spaced apart by a predetermined distance, the fifth and sixth electrodes having a total width, including the predetermined distance, of less than or equal to $\lambda/2\pi$, which is a near field range; and
a third inductor connected between the fifth and sixth electrodes,
the fifth and sixth electrodes being disposed between the first and second electrodes of the power transmitting device and the third and fourth electrodes of the power receiving device,
a resonance frequency of a coupler including the fifth and sixth electrodes and the third inductor and a resonance frequency of couplers of the power transmitting device and the power receiving device being configured to be equal.

8. The wireless power transmission system according to claim 1, wherein a frequency of the alternating current power generating section is set at substantially the same frequency as a resonance frequency of the coupler including the first and second electrodes and the at least one first inductor.

9. The wireless power transmission system according to claim 1, wherein a frequency of the alternating current power generating section is set at a frequency at which transmission efficiency of power from the power transmitting device to the power receiving device is maximum.

10. The wireless power transmission system according to claim 1, wherein
the at least one first inductor includes two inductors that are an inductor interposed between the first electrode and the first connection line and an inductor interposed between the second electrode and the second connection line, and
the at least one second inductor includes two inductors that are an inductor interposed between the third electrode and the third connection line and an inductor interposed between the fourth electrode and the fourth connection line.

11. The wireless power transmission system according to claim 1, wherein
an insulating coating is applied on exposed surfaces of the first and second electrodes; and
an insulating coating is applied on exposed surfaces of the third and fourth electrodes.

12. A wireless power transmission system that wirelessly transmits alternating current power from a power transmitting device to a power receiving device, the wireless power transmission system comprising:
the power transmitting device including:
first electrodes spaced apart by a predetermined distance, the first and second electrodes having a total width, including the predetermined distance, of less than or equal to $\lambda/2\pi$, which is a near field range;
a first connection line that electrically connects the first electrode and one of two output terminals of an alternating current power generating section;
a second connection line that electrically connects the second electrode and the other of two output terminals of the alternating current power generating section; and
at least one first inductor that is interposed between the first and second electrodes and at least one of the two output terminals of the alternating current power generating section,
the power receiving device including:
third and fourth electrodes spaced apart by a predetermined distance, the third and fourth electrodes having a total width, including the predetermined distance, of less than or equal to $\lambda/2\pi$, which is a near field range;
a third connection line that electrically connects the third electrode and one of two input terminals of a load;
a fourth connection line that electrically connects the fourth electrode and the other of two input terminals of the load; and
at least one second inductor that is interposed between the third and fourth electrodes and at least one of the two input terminals of the load,
a coupler including the first and second electrodes and the at least one first inductor forms one resonant circuit and a coupler including the third and fourth electrodes and the at least one second inductor forms another resonant circuit,
a resonance frequency of the coupler including the first and second electrodes and the at least one first inductor and a resonance frequency of the coupler including the third and fourth electrodes and the at least one second inductor being configured to be equal, the first and second electrodes and the third and fourth electrodes being spaced apart by a distance of less than or equal to $\lambda/2\pi$, which is a near field range, the first and second electrodes having a curved shape and oppose each other to form a first tubular structure, an outer periphery of the first tubular structure having a length of less than or equal to $\lambda/2\pi$, which is a near field range;

the third and fourth electrodes having a curved shape and oppose each other to form a second tubular structure, an outer periphery of the second tubular structure having a length of less than or equal to $\lambda/2\pi$, which is a near field range;

the first and second tubular structures being disposed concentrically in such a manner that a slit separating the first and second electrodes and a slit separating the third and fourth electrodes oppose each other; and wherein the first and second electrodes and the third and fourth electrodes are coupled with electric field resonance so that the alternating current power is transmitted from the first and second electrodes of the power transmitting device to the third and fourth electrodes of the power receiving device by use of an electric field.

13. A power transmitting device in a wireless power transmission system that wirelessly transmits alternating current power from a power transmitting device to a power receiving device, comprising:

first and second electrodes spaced apart by a predetermined distance, the first and second electrodes having a total width, including the predetermined distance, of less than or equal to $\lambda/2\pi$, which is a near field range;

a first connection line that electrically connects the first electrode and one of two output terminals of an alternating current power generating section;

a second connection line that electrically connects the second electrode and the other of two output terminals of the alternating current power generating section; and at least one first inductor that is interposed between the first and second electrodes and at least one of the two output terminals of the alternating current power generating section, a coupler including the first and second electrodes and the at least one first inductor forms one resonant circuit and a coupler including third and fourth electrodes of the power receiving device and the at least one second inductor forms another resonant circuit, a resonance frequency of the coupler including the first and second electrodes and the at least one first inductor is configured to be equal to a resonance frequency of the coupler including the third and fourth electrodes and the at least one second inductor of the power receiving device, the first and second electrodes and the third and fourth electrodes being spaced apart by a distance of less than or equal to $\lambda/2\pi$, which is a near field range, and wherein the first and second electrodes and the third and fourth electrodes are coupled with electric field resonance so that the alternating current power is transmitted from the first and second electrodes of the power transmitting device to the third and fourth electrodes of the power receiving device by use of an electric field.

14. A power receiving device in a wireless power transmission system that wirelessly transmits alternating current power from a power transmitting device to a power receiving device, comprising:

third and fourth electrodes spaced apart by a predetermined distance, the third and fourth electrodes having a total width, including the predetermined distance, of less than or equal to $\lambda/2\pi$, which is a near field range;

a third connection line that electrically connects the third electrode and one of two input terminals of a load;

a fourth connection line that electrically connects the fourth electrode and the other of two input terminals of the load; and at least one second inductor that is interposed between the third and fourth electrodes and at least one of the two input terminals of the load, a coupler including first and second electrodes of the power transmitting device and the at least one first inductor forms one resonant circuit and a coupler including the third and fourth electrodes and the at least one second inductor forms another resonant circuit, a resonance frequency of the coupler including the third and fourth electrodes and the at least one second inductor is configured to be equal to a resonance frequency of the coupler including the first and second electrodes and the first inductor of the power transmitting device, and wherein the first and second electrodes and the third and fourth electrodes are coupled with electric field resonance so that the alternating current power is transmitted from the first and second electrodes of the power transmitting device to the third and fourth electrodes of the power receiving device by use of an electric field.

\* \* \* \* \*